(12) United States Patent
Yamakawa et al.

(10) Patent No.: US 8,558,500 B2
(45) Date of Patent: Oct. 15, 2013

(54) CONTROL SYSTEM FOR AC MOTOR

(75) Inventors: Toshifumi Yamakawa, Okazaki (JP);
Kenji Yamada, Nagoya (JP); Toshikazu Ono, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 78 days.

(21) Appl. No.: 13/140,635

(22) PCT Filed: Nov. 3, 2009

(86) PCT No.: PCT/IB2009/007296
§ 371 (c)(1),
(2), (4) Date: Jun. 17, 2011

(87) PCT Pub. No.: WO2010/073073
PCT Pub. Date: Jul. 1, 2010

(65) Prior Publication Data
US 2011/0248663 A1    Oct. 13, 2011

(30) Foreign Application Priority Data

Dec. 22, 2008  (JP) .................................. 2008-326374

(51) Int. Cl.
*H02P 23/00*       (2006.01)

(52) U.S. Cl.
USPC ............ 318/805; 363/131; 363/132; 363/97; 363/98

(58) Field of Classification Search
USPC .......... 318/430–434.254, 805, 807, 609, 661; 324/503–509
See application file for complete search history.

(56) References Cited

U.S. PATENT DOCUMENTS

| | | | | |
|---|---|---|---|---|
| 5,608,300 A | * | 3/1997 | Kawabata et al. | 318/721 |
| 5,739,650 A | * | 4/1998 | Kimura et al. | 318/400.07 |
| 6,094,364 A | * | 7/2000 | Heikkila | 363/41 |
| 7,049,778 B2 | * | 5/2006 | Katanaya | 318/400.04 |
| 7,574,294 B2 | * | 8/2009 | Ta et al. | 701/41 |
| 8,264,181 B2 | * | 9/2012 | Yamakawa et al. | 318/432 |
| 2006/0006825 A1 | * | 1/2006 | Inaguma et al. | 318/432 |
| 2008/0067960 A1 | * | 3/2008 | Maeda et al. | 318/400.02 |
| 2009/0146589 A1 | * | 6/2009 | Hattori et al. | 318/400.02 |

FOREIGN PATENT DOCUMENTS

| | | |
|---|---|---|
| EP | 1 460 758 A2 | 9/2004 |
| EP | 1 800 934 A2 | 6/2007 |
| JP | A-2004-289927 | 10/2004 |
| JP | A-2006-054995 | 2/2006 |
| JP | A-2006-320039 | 11/2006 |
| JP | A-2008-001183 | 1/2008 |
| JP | A-2008-228431 | 9/2008 |
| JP | 2010088240 A * | 4/2010 |

OTHER PUBLICATIONS

Written Opinion of the International Searching Authority issued in Application No. PCT/IB2009/007296; Dated Apr. 23, 2010.
International Search Report issued in Application No. PCT/IB2009/007296; Dated Apr. 23, 2010.

* cited by examiner

*Primary Examiner* — Eduardo Colon Santana
*Assistant Examiner* — Said Bouziane
(74) *Attorney, Agent, or Firm* — Oliff & Berridge, PLC

(57) ABSTRACT

A control system for an AC motor determines a slope Ktl of a tangent TL at an operating point Pa corresponding to the current motor operating state and voltage phase (θ0) on a torque characteristic curve that is plotted according to a torque equation representing an output torque characteristic with respect to the motor operating state and the voltage phase of the rectangular wave voltage. The control system further calculates a voltage phase change amount θff for use in feed-forward control, according to ΔTtl/Ktl obtained by dividing a torque compensation amount ΔTtl for feed-forward control by the slope Ktl.

18 Claims, 17 Drawing Sheets

FIG. 2

| CONTROL METHOD | I. SINUSOIDAL PWM | II. OVERMOCULATION PWM | III. RECTANGULAR WAVE (1 PULSE) |
|---|---|---|---|
| VOLTAGE WAVEFORM OF INVERTER OUTPUT | FUNDAMENTAL COMPONENT | FUNDAMENTAL COMPONENT | FUNDAMENTAL COMPONENT |
| MODULATION RATE | 0~0.61 | 0.61~0.78 | 0.78 |
| CHARACTERISTICS | SMALL TORQUE VARIATION | IMPROVED OUTPUT IN MID-SPEED RANGE | IMPROVED OUTPUT IN HIGH-SPEED RANGE |

FIG. 10

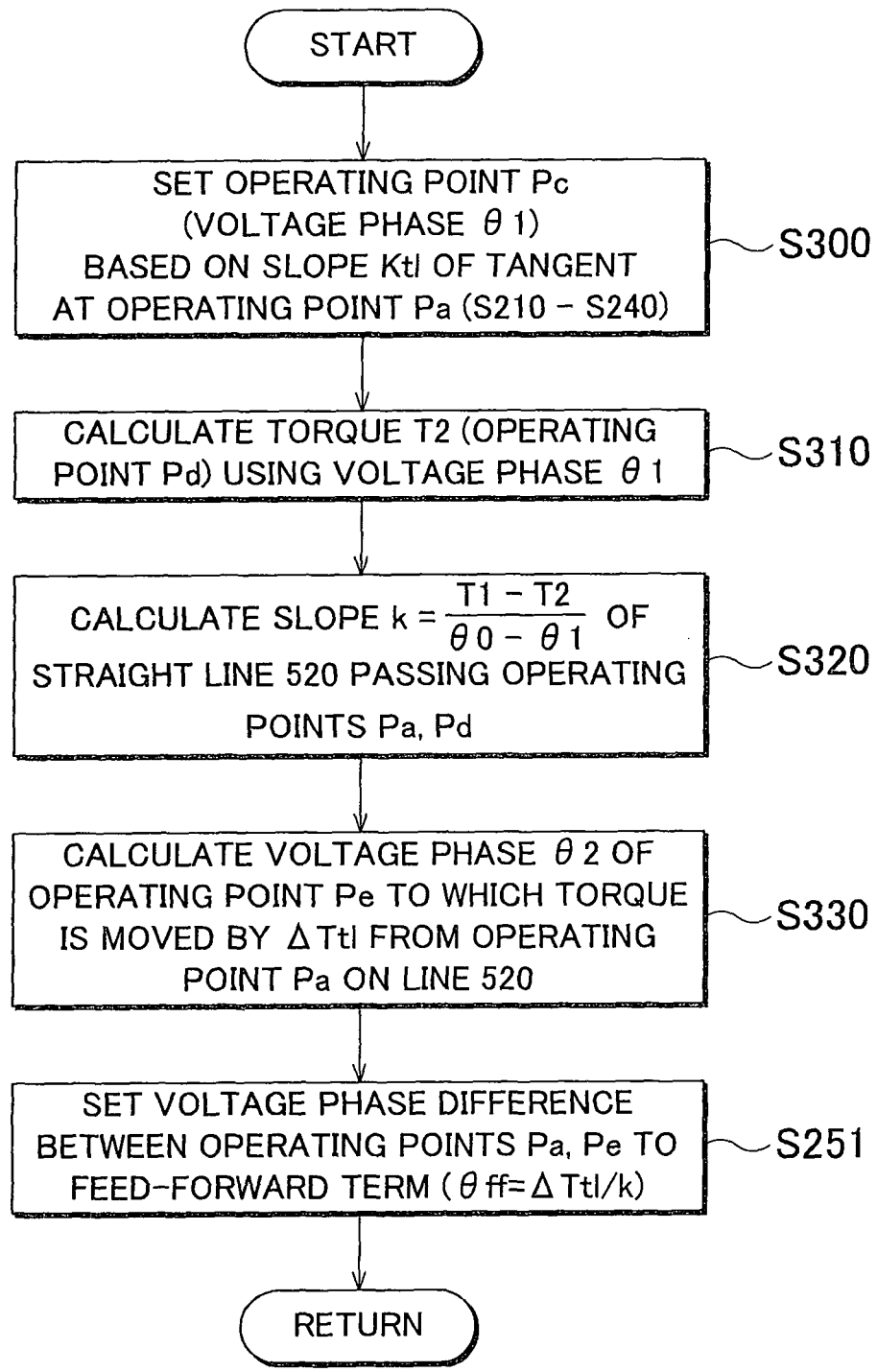

START
↓
SET OPERATING POINT Pc (VOLTAGE PHASE $\theta 1$) BASED ON SLOPE Ktl OF TANGENT AT OPERATING POINT Pa (S210 - S240) — S300
↓
CALCULATE TORQUE T2 (OPERATING POINT Pd) USING VOLTAGE PHASE $\theta 1$ — S310
↓
CALCULATE SLOPE $k = \dfrac{T1 - T2}{\theta 0 - \theta 1}$ OF STRAIGHT LINE 520 PASSING OPERATING POINTS Pa, Pd — S320
↓
CALCULATE VOLTAGE PHASE $\theta 2$ OF OPERATING POINT Pe TO WHICH TORQUE IS MOVED BY $\Delta$Ttl FROM OPERATING POINT Pa ON LINE 520 — S330
↓
SET VOLTAGE PHASE DIFFERENCE BETWEEN OPERATING POINTS Pa, Pe TO FEED-FORWARD TERM ($\theta$ ff= $\Delta$Ttl/k) — S251
↓
RETURN F I G. 14
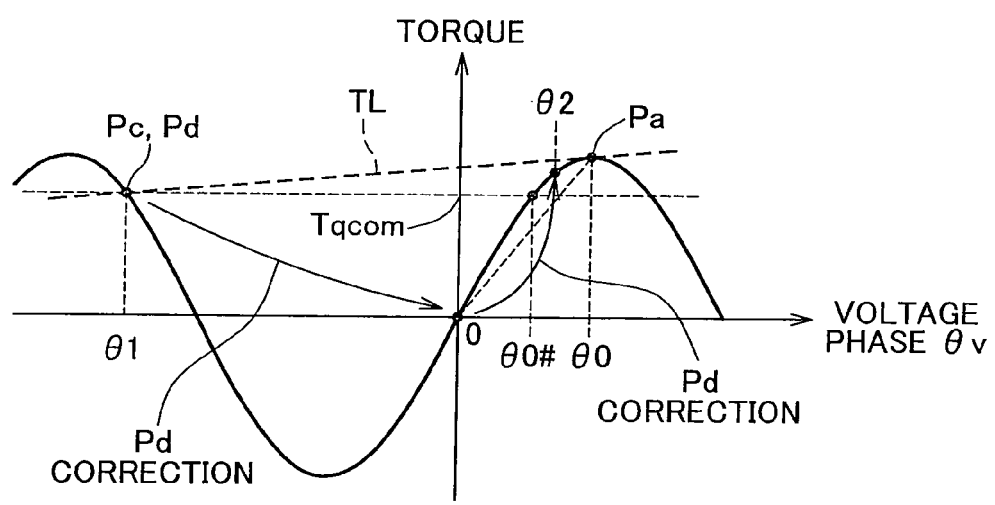

CONTROL SYSTEM FOR AC MOTOR

BACKGROUND OF THE INVENTION

1. Field of the Invention

The invention relates to a control system for controlling an AC motor, and more particularly to a motor control system that converts DC voltage into rectangular wave AC voltage by means of an inverter, and applies the AC voltage to the AC motor.

2. Description of the Related Art

A motor control system is generally used which converts DC voltage into AC voltage via an inverter and applies the AC voltage to the AC motor so as to drive the motor under control. In the motor control system of this type, motor current is generally controlled according to sinusoidal pulse width modulation (PWM) control based on vector control, so as to drive the AC motor with high efficiency.

With the sinusoidal PWM control, however, a fundamental component of the output voltage of the inverter cannot be sufficiently raised and the voltage utilization factor is limited, which makes it difficult to provide high output or power in a high-speed region. In view of this point, it has been proposed to employ a control method that enables the inverter to produce an output voltage having a larger fundamental component than that produced under the sinusoidal PWM control.

Japanese Patent Application Publication No. 2006-320039 (JP-A-2006-320039) describes a control method according to which a rectangular wave voltage having an amplitude equal to that of voltage variably controlled by a converter is applied to the AC motor. In the control method described in JP-A-20006-320039, in particular, the voltage phase of the rectangular wave voltage is basically changed in accordance with a torque deviation, and, upon a rapid change of the rotational speed of the motor, the output voltage of the converter is changed in accordance with the rate of change of the motor speed.

In a drive control system for controlling an AC motor that is rotated with a rectangular wave voltage applied thereto, as described in Japanese Patent Application Publication No. 2006-54995 (JP-A-2006-54995), a first voltage phase determined according to an actual torque value based on detected voltage/current values and a command torque value, and a second voltage phase determined according to an estimated torque value based on a motor model and the command torque value are calculated, and a value obtained by weighing the first and second voltage phases is used as a phase of the rectangular wave voltage.

In the control systems of JP-A-2006-320039 and JP-A-2006-54995, phase control of the rectangular wave voltage is performed by feeding the actual or estimated torque of the AC motor back to the system. When a torque command value is changed during the torque feedback control, a torque deviation (a difference between the actual torque and the torque command value) due to the change in the torque command value is detected, and then the voltage phase is changed according to a control operation or computation for eliminating the torque deviation. Accordingly, there is room for improvement in the control response when the torque command value is changed.

In the meantime, the output torque of the AC motor is changed not only depending on the voltage phase as a manipulated variable of the rectangular wave voltage control, but also depending on motor operating conditions, a typical example of which is the motor rotational speed. Generally, the output torque changes non-linearly with respect to the voltage phase in the rectangular wave voltage control: therefore, when feed-forward control based on the torque command value is put into effect, a complicated operation (computation) and/or a high load on the system may be needed to calculate an amount of change in voltage phase corresponding to the required torque compensation amount.

SUMMARY OF THE INVENTION

The invention provides a control system for an AC motor, which performs feed-forward control for changing a voltage phase of rectangular wave voltage applied to the AC motor based on a torque command value, such that an amount of change in voltage phase for achieving torque compensation is obtained through simple computations or calculations.

A first aspect of the invention is concerned with a control system for an AC motor, which includes an inverter and a rectangular wave voltage controller. The inverter converts DC voltage into AC voltage for driving and rotating the AC motor. The rectangular wave voltage controller is configured to control a voltage phase of a rectangular wave voltage applied to the AC motor so as to perform torque control. The rectangular wave voltage controller includes a linear approximation unit and a phase change amount calculation unit. The linear approximation unit calculates a first slope as a ratio of a change in torque to a change in the voltage phase at a first operating point corresponding to the current operating state of the AC motor and voltage phase, based on the voltage phase and the operating state of the AC motor. The phase change amount calculation unit calculates a torque compensation amount based on a command value of the torque control, and calculates an amount of change of the voltage phase according to a first phase change amount obtained by dividing the torque compensation amount by the first slope.

The phase change amount calculation unit may calculate a torque value at a second operating point corresponding to the current operating state and a first voltage phase to which the voltage phase is changed from the current value by the first phase change amount, according to a torque equation using at least one motor variable associated with the operating state and the voltage phase as variables, and may calculate a second slope as a ratio of a torque difference to a voltage phase difference between the first and second operating points. Furthermore, the phase change amount calculation unit may calculate an amount of change of the voltage phase according to a second phase change amount obtained by dividing the torque compensation amount by the second slope.

The phase change amount calculation unit may further set a third operating point corresponding to the current operating state and a second voltage phase to which the voltage phase is changed from the current value by the second phase change amount, calculate a torque value at the third operating point according to the torque equation, and determine whether a difference between the calculated torque value and the command value is smaller than a predetermined value. Then, the phase change amount calculation unit may further calculate a third slope as a ratio of a torque difference to a voltage phase difference between the third and first operating points when the difference is equal to or larger than the predetermined value, and calculate an amount of change of the voltage phase according to a third phase change amount obtained by dividing the torque compensation amount by the third slope.

In the arrangement as described above, in particular, the phase change amount calculation unit may include an updating unit and a torque difference determination unit. The updating unit updates the third slope and the third phase change amount, based on a ratio of a torque difference to a voltage phase difference between the first operating point and the currently obtained third operating point, and updates the third operating point to an operating point corresponding to the current operating state and a voltage phase to which the voltage phase is changed from the current value by the updated third phase change amount. The torque difference determination unit compares a difference between a torque value at the updated third operating point and the command value with the predetermined value each time the third operating point is updated by the updating unit, and causes the updating unit to repeatedly perform an updating operation on the third operating point as long as the difference is equal to or larger than the predetermined value.

A second aspect of the invention is concerned with a control system for an AC motor, which includes an inverter and a rectangular wave voltage controller. The inverter converts DC voltage into AC voltage for driving and rotating the AC motor. The rectangular wave voltage controller controls a voltage phase of a rectangular wave voltage applied to the AC motor so as to perform torque control. The rectangular wave voltage controller includes a linear approximation unit, a phase change amount calculation unit, a positive/negative checking unit, first and second torque calculation units, a torque difference determination unit and an updating unit. The linear approximation unit calculates a first slope as a ratio of a change in torque to a change in the voltage phase at a first operating point corresponding to the current operating state of the AC motor and voltage phase, based on the voltage phase and the operating state of the AC motor. The phase change amount calculation unit calculates a torque compensation amount based on a command value of the torque control, and calculates a first phase change amount by dividing the torque compensation amount by the first slope. The positive/negative checking unit determines whether a first voltage phase to which the voltage phase is changed by the first phase change amount from the current value thereof and the command value are of the same sign, and corrects the first voltage phase to a predetermined value when the first voltage phase and the command value are of opposite sign, while maintaining the first voltage phase when the first voltage phase and the command value are of the same sign. The first torque calculation unit calculates a torque value at a second operating point corresponding to the corrected or maintained first voltage phase and the current operating state, according to a torque equation using at least one motor variable associated with the operating state of the AC motor and the voltage phase as variables. The torque difference determination unit determines whether a difference between the torque value at the second operating point and the command value is smaller than a predetermined value. The updating unit determines a second phase change amount by dividing the torque compensation amount by a second slope as a ratio of a torque difference to a voltage phase difference between the currently obtained second operating point and the first operating point when the torque difference determination unit determines that the difference is equal to or larger than the predetermined value, and updates the second operating point to an operating point corresponding to the current operating state and a second voltage phase to which the voltage phase is changed by the second phase change amount from the current value. The second torque calculation unit calculates a torque value at the updated second operating point according to the torque equation each time the second operating point is updated by the updating unit. The torque difference determination unit determines whether a difference between the torque value and the command value is smaller than the predetermined value each time the torque value is calculated by the first or second torque calculation unit. Furthermore, the phase change amount calculation unit calculates an amount of change of the voltage phase according to a voltage phase difference between the currently obtained second operating point and the first operating point if the torque difference determination unit determines that the difference is smaller than the predetermined value.

The positive/negative checking unit may set the first voltage phase to a voltage phase at which output torque of the AC motor is substantially equal to zero, when the first voltage phase and the command value are of opposite sign.

The rectangular wave voltage controller may further include a phase change limiting unit that corrects the amount of change of the voltage phase calculated by the phase change amount calculation unit so that the amount of change falls within a prescribed range, when the calculated amount of change of the voltage phase is outside the prescribed range.

The phase change amount calculation unit may calculate the torque compensation amount according to an amount of change of the command value between the last control cycle and the present control cycle.

The phase change amount calculation unit may calculate a torque value at the first operating point according to a torque equation using at least one motor variable associated with the operating state of the AC motor and the voltage phase as variables, and may calculate the torque compensation amount according to a difference between the torque value and the command value.

The linear approximation unit may calculate the first slope according to a differential equation obtained by differentiating a torque equation that uses at least one motor variable associated with the operating state of the AC motor and the voltage phase as variables, with respect to the voltage phase.

The rectangular wave voltage controller may further include a feedback control unit and a calculation unit. The feedback control unit controls the voltage phase of the rectangular wave voltage through feedback on a torque deviation from the command value. The calculation unit sets a command value of the voltage phase, according to a sum of the voltage phase set by the feedback control unit and the amount of change calculated by the phase change amount calculation unit.

The AC motor may be installed on an electrically operated vehicle, and may generate vehicle driving force for driving the electrically operated vehicle.

According to the present invention, the feed-forward control for changing the voltage phase of rectangular wave voltage applied to the AC motor based on the torque command value may be performed, such that the amount of change in the voltage phase for achieving torque compensation can be obtained through simple computations or calculations.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 2 is a table explaining control methods used for electric power conversion in an inverter of the motor control system shown in FIG. 1;

FIG. 10 is a flowchart explaining in detail a process of calculating the feed-forward term in the rectangular wave voltage control according to the first modified example of the first embodiment;

FIG. 14 is a graph useful for explaining calculation of a feed-forward term by a feed-forward controller in rectangular wave voltage control according to a second embodiment of the invention;

DETAILED DESCRIPTION OF EMBODIMENTS

Figure 1:
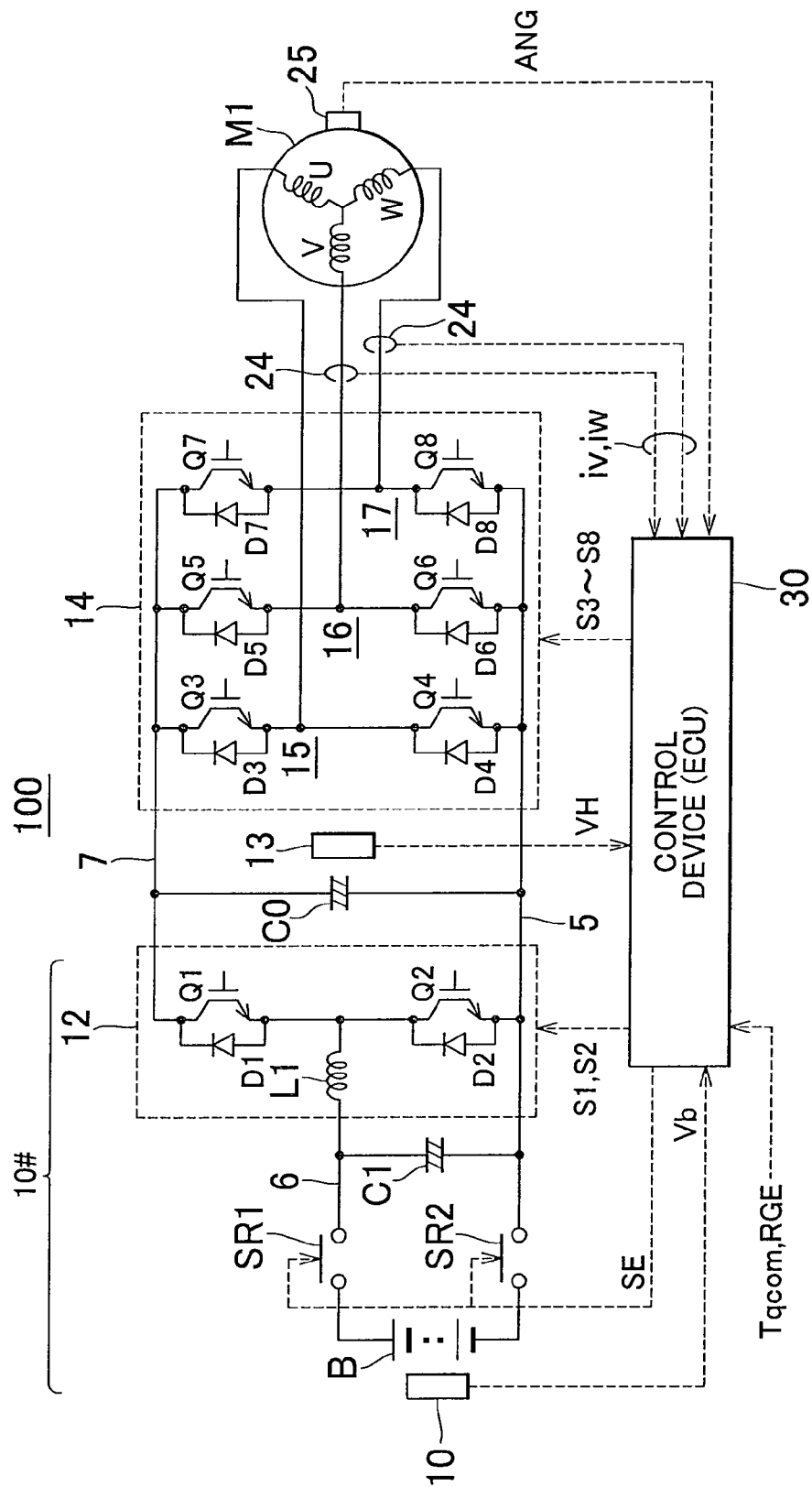
FIG. 1 is a view showing the overall construction of a control system for an AC motor according to an embodiment of the invention.

Some embodiments of the invention will be described in detail with reference to the drawings. In the following description and the drawings, the same reference numerals are assigned to the same or corresponding elements or portions, of which the explanation will not be repeated as a rule.

First Embodiment FIG. 1 shows the overall construction of a control system for an AC (alternating-current) motor according to a first embodiment of the invention.

Referring to FIG. 1, a motor control system 100 includes a DC voltage generating portion 10#, a smoothing capacitor C0, an inverter 14, a control device 30 and an AC motor M1.

The AC motor M1 is an electric motor operable to generate torque for driving drive wheels of an electrically operated vehicle, such as a hybrid vehicle or an electric vehicle. In this embodiment, electrically operated vehicles include all types of vehicles on which an electric motor for generating wheel driving force, including an electric vehicle on which no engine is installed. The AC motor M1 is generally configured to have both the functions of a motor and a generator. When used in a hybrid vehicle, the AC motor M1 may be configured to have the function of a generator driven by the engine. Also, the AC motor M1 may be incorporated in a hybrid vehicle to operate as an electric motor for use with the engine, for example, an electric motor for starting the engine.

The DC voltage generating portion 10# includes a DC power supply B, system relays SR1, SR2, a smoothing capacitor C1 and a converter 12.

The DC power supply B consists of, for example, a secondary battery, such as a nickel metal hydride or lithium-ion battery, a fuel cell, an electric double layer capacitor, or a combination thereof. A DC voltage output Vb of the DC power supply B is measured by a voltage sensor 10. The voltage sensor 10 sends the measured DC voltage Vb to the control device 30.

The system relay SR1 is connected between a positive terminal of the DC power supply B and a power line 6, and the system relay SR2 is connected between a negative terminal of the DC power supply B and a ground line 5. The system relays SR1, SR2 are switched on/off in response to a signal SE from the control device 30. The smoothing capacitor C1 is connected between the power line 6 and the ground line 5.

The converter 12 includes a reactor L1, power semiconductor switching devices Q1, Q2, and diodes D1, D2.

The power semiconductor switching devices Q1 and Q2 are connected in series between a power line 7 and the ground line 5. The ON/OFF states of the power semiconductor switching devices Q1 and Q2 are respectively controlled according to switching control signals S1 and S2 from the control device 30.

In this embodiment of the invention, an IGBT (Insulated Gate Bipolar Transistor), a power MOS (Metal Oxide Semiconductor) transistor, a power bipolar transistor, or the like, may be used as the power semiconductor switching device (hereinafter simply referred to as "switching device"). Anti-parallel diodes D1, D2 are connected to the switching devices Q1, Q2, respectively.

The reactor L1 is connected between a connection node of the switching devices Q1 and Q2 and the power line 6. The smoothing capacitor C0 is connected between the power line 7 and the ground line 5.

The inverter 14 is comprised of a U-phase arm 15, a V-phase arm 16 and a W-phase arm 17, which are disposed in parallel with each other between the power line 7 and the ground line 5. Each phase arm consists principally of switching devices connected in series between the power line 7 and the ground line 5. For example, the U-phase arm 15 consists principally of switching devices Q3, Q4, and the V-phase arm 16 consists principally of switching devices Q5, Q6, while the W-phase arm 17 consists principally of switching devices Q7, Q8. Also, anti-parallel diodes D3-D8 are connected to the switching devices Q3-Q8, respectively. The ON/OFF states of the switching devices Q3-Q8 are controlled according to switching control signals S3-S8 from the control device 30.

An intermediate point of each phase arm is connected to a corresponding phase coil of the AC motor M1. Typically, the AC motor M1 is a three-phase permanent magnet motor including three coils of U, V and W phases, which are connected at one end to a common middle point. The other end of each of the U-, V- and W-phase coils is connected to an intermediate point between the switching devices of a corresponding one of the U-, V- and W-phase arms 15-17.

The converter 12, when operating as a step-up transformer, boosts or increases the DC voltage Vb supplied from the DC power supply B, to a DC voltage VH (which corresponds to an input voltage to the inverter 14 and will also be called "system voltage"), and supplies the DC voltage VH to the inverter 14. The converter 12, when operating as a step-down transformer, steps down the DC voltage (system voltage) supplied from the inverter 14 via the smoothing capacitor C0, and supplies the resultant voltage to the DC power supply B for charging. During the step-up and step-down transformations, the ON/OFF states of the switching devices Q1, Q2 are controlled in response to the switching control signals S1, S2 from the control device 30. If the switching devices Q1 and Q2 are fixed to the ON and OFF states, respectively, the DC voltage VH is made equal to Vb (i.e., the voltage ratio is equal to 1.0).

The smoothing capacitor C0 smoothes the DC voltage from the converter 12, and supplies the smoothed DC voltage to the inverter 14. A voltage sensor 13 measures voltage between the opposite ends of the smoothing capacitor C0, namely, measures the system voltage VH, and sends the measured voltage to the control device 30.

If a torque command value of the AC motor M1 is positive (Tqcom>0), the inverter 14 converts the DC voltage supplied from the smoothing capacitor C0, into an appropriate voltage (AC voltage) to be applied to the motor, through the switching operations of the switching devices Q3-Q8 responsive to the switching control signals S3-S8 from the control device 30, and drives the AC motor M1 to generate positive torque. If a torque command value of the AC motor M1 is equal to zero (Tqcom=0), the inverter 14 converts the DC voltage into an appropriate voltage (AC voltage) to be applied to the motor, through the switching operations responsive to the switching control signals S3-S8, and drives the AC motor M1 so that torque becomes equal to zero. In this manner, the AC motor M1 is driven to generate zero or positive torque designated by the torque command value Tqcom.

At the time of regenerative braking of the electrically operated vehicle on which the motor control system 100 is installed, the torque command value Tqcom of the AC motor M1 is set to a negative value (Tqcom>0). In this case; the inverter 14 converts the AC voltage of power generated by the AC motor M1 into DC voltage, through the switching operations responsive to the switching control signals S3-S8, and supplies the resulting DC voltage (system voltage) to the converter 12 via the smoothing capacitor C0. The regenerative braking mentioned herein includes braking accompanied by regenerative power generation in the case where the foot brake pedal is operated by the driver who drives the electrically operated vehicle, and decelerating the vehicle (or stopping acceleration) by releasing the accelerator pedal during running so as to effect regenerative power generation in the case where the foot brake is not operated.

Current sensors 24 measure motor currents that flow into the AC motor M1, and send the measured motor currents to the control device 30. Since the sum of instantaneous values of three phase currents iu, iv, iw is equal to zero, the current sensors 24 may be arranged to detect motor currents for two phases (e.g., V-phase current iv and W-phase current iw), as shown in FIG. 1.

A rotational angle sensor (resolver) 25 measures the rotational angle ANG of the rotor of the AC motor M1, and sends the measured rotational angle ANG to the control device 30.

The control device 30 calculates the rotational speed (represented by the number of revolutions per unit time (typically, rpm)) and angular velocity ω (rad/s) of the AC motor M1 based on the rotational angle ANG. The rotational angle sensor 25 may be eliminated if the control device 30 calculates the rotational angle ANG directly from the motor voltage or current.

The control device 30 consists of an electronic control unit (ECU) incorporating a CPU (Central Processing Unit) and a memory, which are not illustrated, and performs computations using measured values received from respective sensors, based on maps and programs stored in the memory. Through the computations, the control device 30 controls the operation of the motor control system 100 so that the AC motor M1 is operated according to an operation command from a higher-level ECU. It is to be understood that a part of the control device 30 may be provided by hardware, such as an electronic circuit, which performs certain mathematical or logic operations.

More specifically, the control device 30 controls the operations of the converter 12 and inverter 14, so that the AC motor M1 produces torque commensurate with the torque command value Tqcom by a method as will be described later, based on the torque command value Tqcom, battery voltage Vb measured by the voltage sensor 10, system voltage VH measured by the voltage sensor 13, motor currents iv, iw received from the current sensors 24, and the rotational angle ANG received from the rotational angle sensor 25. Namely, the control device 30 produces switching control signals S1-S8 for controlling the converter 12 and inverter 14 in the manner as described above, and transmits the switching control signals S1-S8 to the converter 12 and inverter 14.

When the converter 12 operates as a step-up transformer, the control device 30 controls the output voltage VH of the smoothing capacitor C0 in a feedback fashion, and produces switching control signals S1, S2 so that the output voltage VH becomes equal to a voltage command value.

If the control device 30 receives a signal RGE indicating that the electrically operated vehicle is operating in a regenerative braking mode from a higher-level ECU, the control device 30 produces switching control signals S3-S8 so as to convert the AC voltage of power generated by the AC motor M1 into DC voltage, and transmits the signals S3-S8 to the inverter 14. As a result, the inverter 14 converts the AC voltage generated by the AC motor M1 into the corresponding DC voltage, and supplies the DC voltage to the converter 12.

Furthermore, if the control device 30 receives the signal RGE indicating that the electrically operated vehicle is operating in the regenerative braking mode from an external ECU, the control device 30 produces switching control signals S1, S2 so as to step down the DC voltage supplied from the inverter 14, and transmits the signals S1, S2 to the converter 12. As a result, the AC voltage generated by the AC motor M1 is converted into DC voltage, which is then stepped down and supplied to the DC power supply B. In addition, the control device 30 produces a signal SE for switching on/off the system relays SR1, SR2, and transmits the signal SE to the system relays SR1, SR2.

Next, power conversion effected in the inverter 14 under control of the control device 30 will be described in detail.

As shown in FIG. 2, the motor control system 100 according to this embodiment of the invention uses a selected one of three control modes for power conversion in the inverter 14.

Sinusoidal PWM control is used as general PWM control, in which the ON/OFF states of the switching devices of each phase arm are controlled in accordance with voltage comparisons between a voltage command value or signal in the form of a sinusoidal wave and a carrier wave (typically, a triangular wave). As a result, for a collection of high-level periods corresponding to the ON periods of the upper arm device (Q3, Q5, Q7 in FIG. 1) and low-level periods corresponding to the ON periods of the lower arm device (Q4, Q6, Q8), the duty ratio is controlled so that the fundamental component provides a sinusoidal wave in a given period. As well known in the art, under sinusoidal PMW control, the fundamental component (effective value) of line voltage applied to the AC motor M1 can be increased only about 0.61 times as high as the inverter input voltage. In this specification, the ratio of the fundamental component (effective value) of the line voltage of the AC motor M1 to DC link voltage of the inverter 14 (i.e., the system voltage VH) will be called "modulation rate".

In a rectangular wave voltage control mode, on the other hand, voltage corresponding to one pulse of a rectangular wave of which the ratio between the high-level period and the low-level period is 1:1 is applied to the AC motor M1 in the above-mentioned given period. As a result, the modulation rate can be increased to 0.78.

In an overmodulation PWM control mode, PWM control similar to the above-described sinusoidal PWM control is performed with respect to a range in which the amplitude of a voltage command is larger than that of the carrier wave. In particular, the fundamental component can be increased by distorting the voltage command from its original sinusoidal waveform, and the modulation rate can be increased to a range from the maximum modulation rate available in the sinusoidal PWM control mode to 0.78.

As the rotational speed or output torque of the AC motor M1 increases, a voltage induced in the AC motor M1 increases, resulting in an increase of a required driving voltage (required motor voltage). Thus, the voltage boosted by the converter 12, or the system voltage VH, needs to be set to a level higher than the required motor voltage. On the other hand, there is a limit (the maximum VH voltage) to the voltage boosted by the converter 12, or the system voltage VH.

Accordingly, either of the PWM control mode in which the sinusoidal PWM control or overmodulation PWM control is performed so as to control the amplitude and phase of the motor applied voltage (AC) based on feedback of motor current, and the rectangular wave voltage control mode, is selectively applied depending on the operating state of the AC motor M1. In the rectangular wave voltage control mode, the amplitude of the motor applied voltage is fixed; therefore, torque is controlled through phase control of rectangular-wave voltage pulses based on a deviation of an actual torque value from a torque command value.

Figure 3:
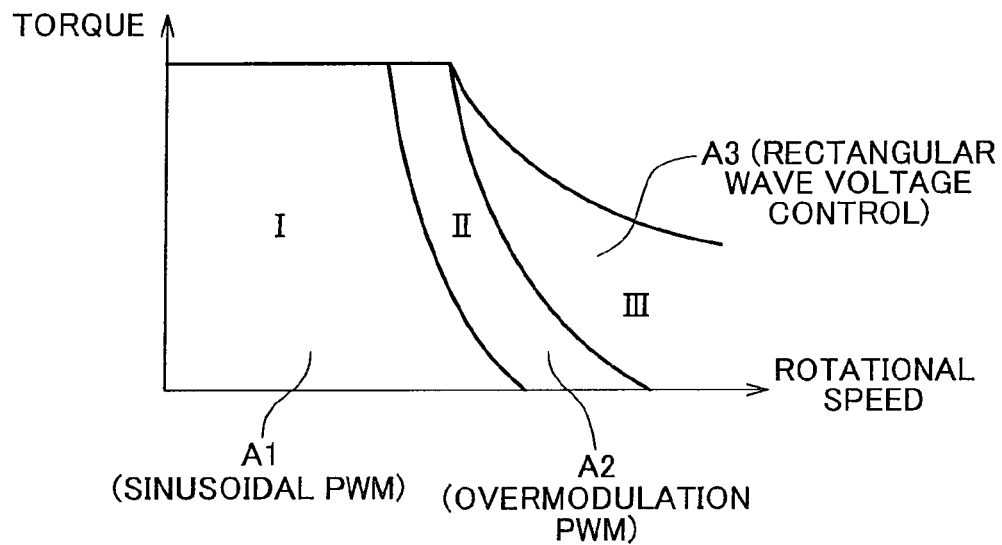
FIG. 3 is a graph indicating general relationships between operating conditions of the AC motor and the control modes.

FIG. 3 shows the relationship between the operating state of the AC motor M1 and the control modes as described above. Referring to FIG. 3, the sinusoidal PWM control is used in a low-speed region A1 so as to reduce torque variations, and the overmodulation PWM control is used in a middle-speed region A2, while the rectangular wave voltage control is used in a high-speed region A3. In particular, the use of the overmodulation PWM control and the rectangular wave voltage control leads to an improvement in the output of the AC motor M1. Thus, which of the control modes as shown in FIG. 2 is to be used is basically determined within a range of the modulation ratio that can be achieved in each mode.

Of the control modes as described above, the sinusoidal PWM control and the overmodulation PWM control may be implemented using certain control configurations or schemes known in the art. For example, the PWM control may be implemented by obtaining d-axis and q-axis current command values from a torque command value Tqcom, so that the output torque of the AC motor M1 becomes equal to the torque command value Tqcom, and controlling motor currents (Id, Iq) in a feedback fashion based on the current command values thus obtained.

The control system for the AC motor according to the present invention has a major feature in the rectangular wave voltage control of the AC motor M1. Thus, the control configuration of the rectangular wave voltage control will be hereinafter described in detail.

Figure 4:
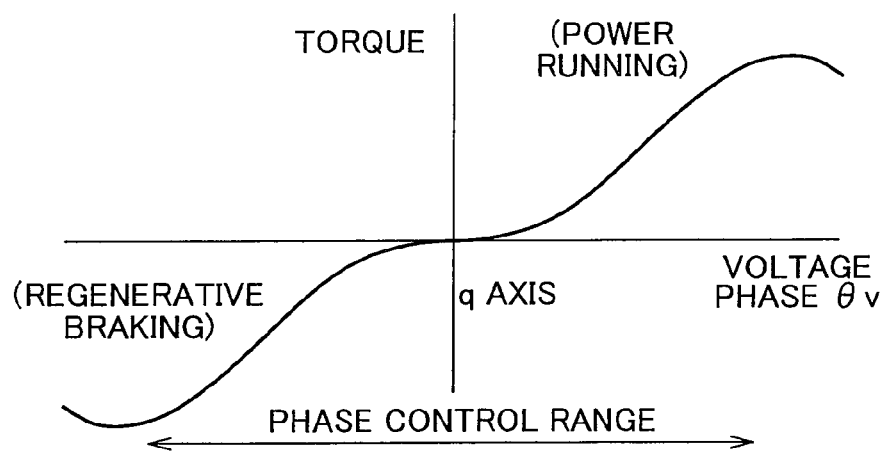
FIG. 4 is a graph indicating the relationship between voltage phase and torque in rectangular wave voltage control.

The rectangular wave voltage control of the AC motor according to this embodiment of the invention is performed in accordance with changes in the output torque with respect to the voltage phase θv, as shown in FIG. 4.

Referring to FIG. 4, when positive torque is produced (Tqcom>0), the voltage phase θv is generally controlled according to a torque deviation (i.e., a deviation of the actual torque from the torque command value), such that the voltage phase θv is advanced where torque is determined as being insufficient, and such that the voltage phase θv is delayed where torque is determined as being excessive. When negative torque is produced (Tqcom<0), the voltage phase θv is controlled according to a torque deviation, such that the voltage phase θv is delayed where torque is determined as being insufficient, and such that the voltage phase θv is advanced where torque is determined as being excessive.

Figure 5:
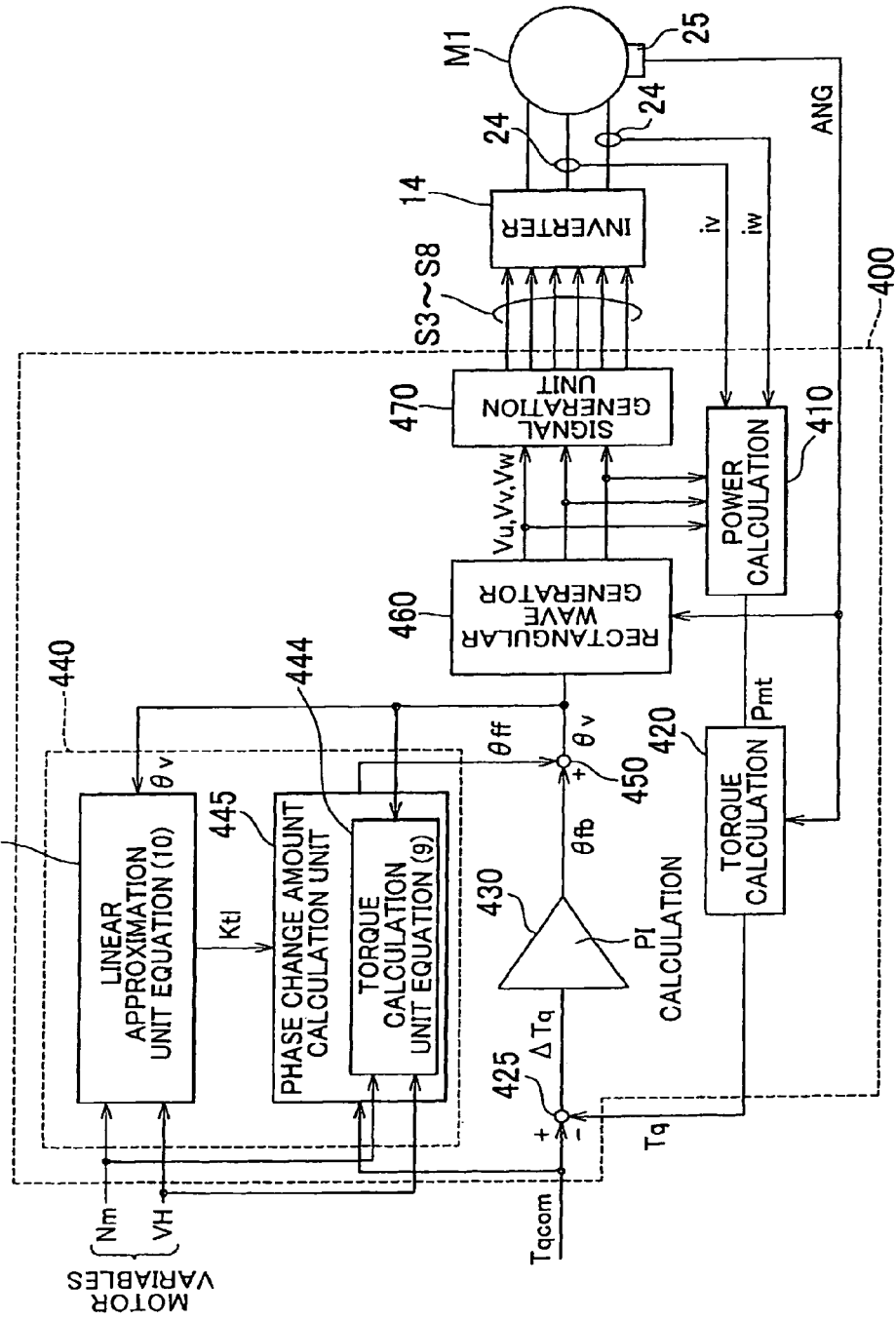
FIG. 5 is a functional block diagram illustrating the control configuration of the rectangular wave voltage control according to the first embodiment.

FIG. 5 is a functional block diagram illustrating the specific control configuration of the rectangular wave voltage control. Referring to FIG. 5, a rectangular wave voltage control block 400 includes a power calculation unit 410, a torque calculation unit 420, a deviation calculation unit 425, a feedback controller 430, a feed-forward controller 440, an addition unit or adder 450, a rectangular wave generator 460, and a signal generation unit 470. The feed-forward controller 440 includes a linear approximation unit 442 and a phase change amount calculation unit 445.

Each functional block of FIG. 5 is implemented according to a certain program executed by the control device 30 and/or a control operation performed by an electronic circuit (hardware) in the control device 30. When the rectangular wave voltage control mode is applied, rectangular wave voltage control according to the configuration of FIG. 5 is executed in given control cycles or at given intervals.

The power calculation unit 410 calculates power (motor power) Pmt supplied to the motor according to the following equation (1), based on each phase current (U-phase current, V-phase current, W-phase current) including the V-phase current iv and W-phase current iw detected by the current sensors 24, and each phase voltage, i.e., U-phase, V-phase and W-phase voltages Vu, Vv, Vw.

$$Pmt = iu \cdot Vu + iv \cdot Vv + iw \cdot Vw \quad (1)$$

The torque calculation unit 420 calculates an estimated torque value Tq according to the following equation (2), using the motor power Pmt obtained by the power calculation unit 410 and the angular velocity ω calculated from the rotational angle ANG of the AC motor M1 detected by the rotational angle sensor 25.

$$Tq = Pmt/\omega \quad (2)$$

It is to be understood that the method of estimating torque (i.e., determining the estimated torque value Tq) is not limited to the above-described method using the power calculation unit 410 and the torque calculation unit 420, but torque may be estimated by any other method. For example, a torque sensor may be provided in place of the power calculation unit 410 and the torque calculation unit 420, and the estimated torque value Tq may be obtained by means of the torque sensor.

The deviation calculation unit 425 calculates a torque deviation ΔTq (ΔTq=Tqcom−Tq), based on the estimated torque value Tq and the torque command value Tqcom.

The feedback controller 430 performs a proportional integral (PI) operation using a given gain, based on the torque deviation ΔTq, so as to obtain a deviation or control error, and calculates a feedback term θfb of the rectangular wave voltage phase based on the deviation thus obtained. More specifically, when positive torque is produced (Tqcom>0), the feedback term θfb is calculated so that the voltage phase is advanced if torque is determined as being insufficient, and the voltage phase is delayed if torque is determined as being excessive, as shown in FIG. 4. When negative torque is produced (Tqcom<0), the feedback term θfb is calculated so that the voltage phase is delayed if torque is determined as being insufficient, and the voltage phase is advanced if torque is determined as being excessive, as also shown in FIG. 4.

In the above manner, the feedback term θfb set through feedback control based on the torque deviation is obtained by the feedback controller 430. It is, however, to be noted that the voltage phase is the only manipulated variable in the rectangular wave voltage control; therefore, the control response is relatively low as compared with PWM control under which the amplitude and phase of the motor applied voltage can be controlled as manipulated variables. Furthermore, filter processing or filtering for removing noise, or the like, from the detected motor current values is inevitable in the power calculation (Eq. (1)) of the power calculation unit 410, and it is therefore difficult to ensure a sufficient control response only with the feedback control.

The feed-forward controller 440 sets a rectangular wave voltage phase θff by feed-forward control for handling changes in the rotational speed Nm and the system voltage VH as variables (which will also be called "motor variables") associated with the operating state of the AC motor M1, and changes in the torque command value Tqcom. The rotational speed Nm may be calculated from the rotational angle ANG of the AC motor M1 measured by the rotational angle sensor 25. The system voltage VH may be obtained from voltage measured by the voltage sensor 13 or the voltage command value VH#.

The addition unit 450 adds the voltage phase (feedback term) θfb obtained by the feedback control and the voltage phase (feed-forward term) θff obtained by the feed-forward control, so as to set a voltage phase θv representing a phase command of the rectangular wave voltage.

The rectangular wave generator 460 generates U-phase, V-phase and W-phase voltage command values (rectangular wave pulses) Vu, Vv, Vw according to the voltage phase θv set by the addition unit 450. The signal generating unit 470 generates switching control signals S3-S8 according to the U-phase, V-phase and W-phase voltage command values Vu, Vv, Vw. The inverter 14 performs switching operations according to the switching control signals S3-S8, so that the rectangular wave voltages produced according to the voltage phase θv are applied to the respective phases of the motor.

With the above arrangement, the control response can be enhanced by handling changes in the torque command value Tqcom through the feed-forward control. Furthermore, the combination of the feed-forward control with the feedback control makes it possible to eliminate an offset or steady-state deviation.

In the feed-forward control, however, a problem is presented in setting of the feed-forward term θff with respect to changes in the torque command value Tqcom and the motor variables. Generally, in the AC motor M1, the torque changes nonlinearly with respect to the motor variables and the voltage phase. Therefore, it is required to determine the feed-forward term θff in a computation time (period) that falls within one control cycle, or without excessively increasing a computation load in each control cycle. The nonlinear relationship between the torque and the motor variables may be plotted in advance as a map. However, if the number of points in the map is increased so as to improve control accuracy, an enormous amount of data for the map is stored, which may occupy an excessively large portion of the storage region of the ECU.

Accordingly, the feed-forward controller 440 of this embodiment is configured as described below, so as to limit or reduce the computation load required for the feed-forward control and the amount of data stored for the feed-forward control.

For explanation of the rectangular wave voltage feed-forward control according to this embodiment, characteristics of output torque (which will be simply called "torque characteristics") relative to the motor variables indicating motor operating conditions and the voltage phase will be initially explained.

The torque characteristics that reflect the motor operating conditions are understood from equations or expressions for calculation of torque as will be described below. As generally known, equations for voltages on the d-axis and q-axis of the permanent magnet type synchronous motor and an equation for torque are given by the following equations (3)-(5).

$$Vd = Ra \cdot Id - \omega \cdot Lq \cdot Iq \tag{3}$$

$$Vq = \omega \cdot Ld \cdot Id + Ra \cdot Iq + \omega \cdot \Psi \tag{4}$$

$$T = P\{\Psi \cdot Iq + (Ld - Lq) \cdot Id \cdot Iq\} \tag{5}$$

In the above equations (3)-(5), Ra represents the armature winding resistance, and Ψ represents the number of armature flux linkages of the permanent magnet, while P represents the number of magnetic pole pairs of the AC motor M1, and ω represents the electrical angular speed of the AC motor M1. The electrical angular speed ω may be determined according to an equation that ω=2π·(Nm/60)·P, using the motor rotational speed Nm(rpm).

A voltage component that depends on the winding resistance contributes to each of the d-axis and q-axis voltages in a very low speed region, and the other components become dominant as the rotational speed increases. Accordingly, the component depending on the winding resistance can be ignored in the equations (3), (4), in view of the fact that the rectangular wave voltage control is adopted in a high speed region (see FIG. 2). Thus, the above-indicated equations (3), (4) are rewritten into the following equations (6), (7) for use in the rectangular wave voltage control.

$$Vd = -\omega \cdot Lq \cdot Iq \tag{6}$$

$$Vq = \omega \cdot Ld \cdot Id + \omega \cdot \Psi \tag{7}$$

Where it is taken into consideration that the fundamental component of the motor applied voltage (line voltage) represented by the d-axis voltage and q-axis voltage is 0.78 times as high as the system voltage VH during rectangular wave voltage control, a torque equation (8) indicating the relationship between the voltage phase θ of the rectangular wave voltage and the output torque T of the AC motor M1 can be obtained by applying the equations (6), (7) to the above-indicated equation (5).

$$T = P \cdot \psi \cdot \left[\frac{0.78}{Ld}\right] \cdot \left[\frac{VH}{\omega}\right] \cdot \sin\theta + \frac{P}{2} \cdot \frac{(Ld - Lq) \cdot 0.78^2}{Ld \cdot Lq} \cdot \left[\frac{VH}{\omega}\right]^2 \cdot \sin2\theta \quad (8)$$

$$Ka = P \cdot \psi \cdot \left[\frac{0.78}{Ld}\right]$$

$$Kb = \frac{P}{2} \cdot \frac{(Ld - Lq) \cdot 0.78^2}{Ld \cdot Lq}$$

As is understood from the above equation (8), the relationship between the voltage phase θ and the torque T under the current operating conditions is obtained by calculation, without referring to a map, by substituting the motor variables VH, ω(Nm) indicative of the motor operating conditions into the torque equation (8). In the above equation (8), ψ represents the counter electromotive force coefficient of the AC motor M1. Since constants Ka, Kb are fixed in advance as motor constants, the above equation (8) may be rewritten into the following equation (9). Namely, the equations (8), (9) are torque equations according to which torque is calculated using the motor variables VH, ω and voltage phase θ as variables.

$$T = Ka \cdot \left[\frac{VH}{\omega}\right] \cdot \sin\theta + Kb \cdot \left[\frac{VH}{\omega}\right]^2 \cdot \sin2\theta \quad (9)$$

By differentiating the above-indicated equation (9) with the voltage phase θ, the following equation (10) for calculating the ratio Ktl of a torque change to a change in the voltage phase, under the current motor operating conditions and voltage phase, is derived from the equation (9).

$$Kt1 = Ka\left[\frac{VH}{\omega}\right] \cdot \cos\theta + 2Kb \cdot \left[\frac{VH}{\omega}\right]^2 \cdot \cos2\theta \quad (10)$$

Figure 6:
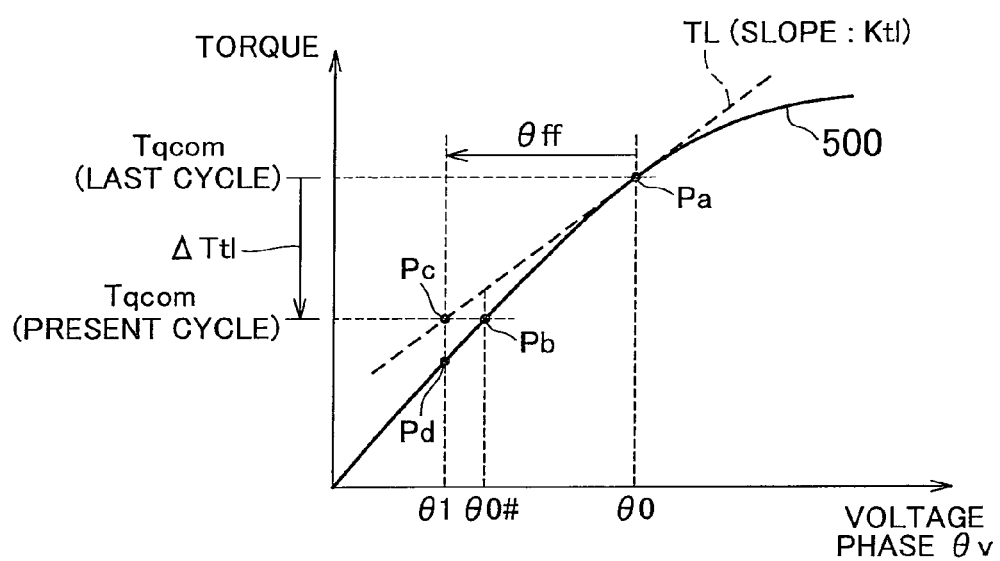
FIG. 6 is a graph useful for explaining in detail calculation of a feed-forward term by a feed-forward controller shown in FIG. 5 in detail.

Referring next to FIG. 6, the functions of the linear approximation unit 442 and the phase change amount calculation unit 445 that constitute the feed-forward controller 440 will be described.

Referring to FIG. 6, a torque characteristic curve 500 is derived by substituting the current motor operating conditions (motor variables) into the equation (9). The slope Ktl of a tangent TL at each operating point on the torque characteristic curve 500 is obtained by substituting the same motor variables as those used in the equation (9), into the equation (10).

An operating point Pa that lies on the torque characteristic curve 500 and corresponds to the current voltage phase θ0 corresponds to the current operating conditions and voltage phase of the AC motor M1. The linear approximation unit 442 as shown in FIG. 5 determines the slope Ktl of the tangent at the operating point Pa according to the above equation (10), using the current motor variables (Nm, VH) and voltage phase θ0. The slope Ktl of the tangent is equivalent to the ratio of a change in torque to a change in the voltage phase, under the current motor operating conditions and voltage phase. Namely, a torque change characteristic relative to the voltage phase can be linearly approximated by determining the tangent slope Ktl.

The phase change amount calculating unit 445 as shown in FIG. 5 calculates a required torque compensation amount ΔTtl, based on the torque command value Tqcom. For example, the torque compensation amount ΔTtl is calculated according to a difference between the torque command value Tqcom obtained in the current control cycle and the torque command value Tqcom obtained in the last control cycle. Alternatively, a torque calculation unit 444 that calculates torque according to the above equation (9) may be provided, the torque value at the current operating point Pa may be calculated, and the torque compensation amount ΔTtl may be calculated according to a difference between the thus calculated torque value and the torque command value Tqcom obtained in the current control cycle.

Then, the voltage phase θ1 of an operating point Pc on the tangent TL, at which the output torque is changed from that of the operating point Pa by the torque compensation amount ΔTtl, is obtained according to the slope Ktl of the tangent. Namely, the amount of change θt1(=θ1−θ0) in the voltage phase required for compensating for the torque compensation amount θTtl is obtained according to the following equation (11). Namely, the operating point Pa may be regarded as "first operating point", and the slope Ktl may be regarded as "first slope", while θtl (or θff in FIG. 6) obtained according to the equation (11) may be regarded as "first phase change amount".

$$\theta tl = \Delta Ttl/Ktl \quad (11)$$

Then, the phase change amount calculating unit 445 sends the voltage phase change amount θtl obtained according to the equation (11) as a feed-forward term θff, to the addition unit 450.

As is understood from the above equation (9), it is difficult to perform an inverse operation to obtain a voltage phase θv corresponding to a torque command value Tqcom from the current motor operating conditions and a target torque value, according to the equation (9). Namely, it is difficult to directly calculate an operating point Pb that lies on the torque characteristic curve 500 and corresponds to the torque command value Tqcom. In this embodiment, on the other hand, the phase change amount calculation unit 445 (FIG. 5) is able to obtain the feed-forward term θff through a relatively simple computation based on the tangent slope Ktl at the operating point Pa, which is obtained by the linear approximation unit 442.

As is understood from FIG. 6, if only the feedback control is performed in response to a change in the torque command value Tqcom, the operating point is gradually changed or moved from Pa to Pb on the torque characteristic curve, based on the detected torque deviation ΔTq. On the other hand, the feed-forward control is performed independently of the feedback control, so that the operating point is changed from the operating point Pa to an operating point Pd on the torque characteristic curve 500 corresponding to the voltage phase θ1. Through the subsequent feedback control, the AC motor M1 is controlled so that the operating point, which is currently at Pd, gradually approaches the desired operating point Pb corresponding to the torque command value Tqcom. Thus, the torque deviation created due to a change in the torque command value Tqcom can be reduced, and the control response can be enhanced.

A control routine or process for implementing the rectangular wave voltage control according to the first embodiment will be described in detail, using the flowcharts of FIG. 7 and FIG. 8. When the rectangular wave voltage control mode is selected, the control routine of FIG. 7 and FIG. 8 is executed in given control cycles or at given intervals.

Each step of each of the flowcharts as described below, including those of FIG. 7 and FIG. 8, may be implemented by software processing where the control device 30 executes a certain program(s) stored in advance, or by hardware processing effected through an operation of an electronic circuit provided by the control device 30.

Figure 7:
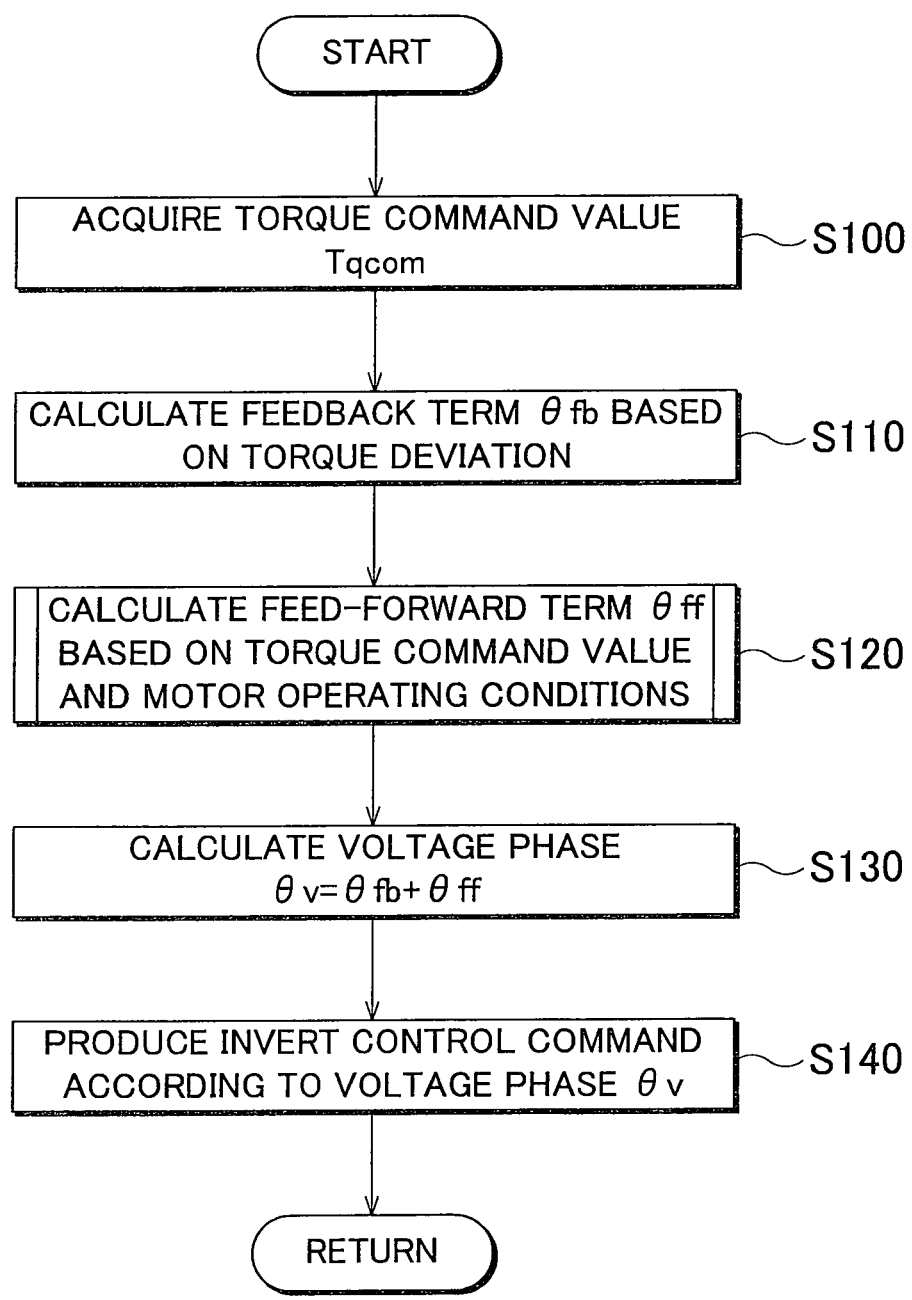
FIG. 7 is a flowchart illustrating a control routine of the rectangular wave voltage control.
Figure 8:
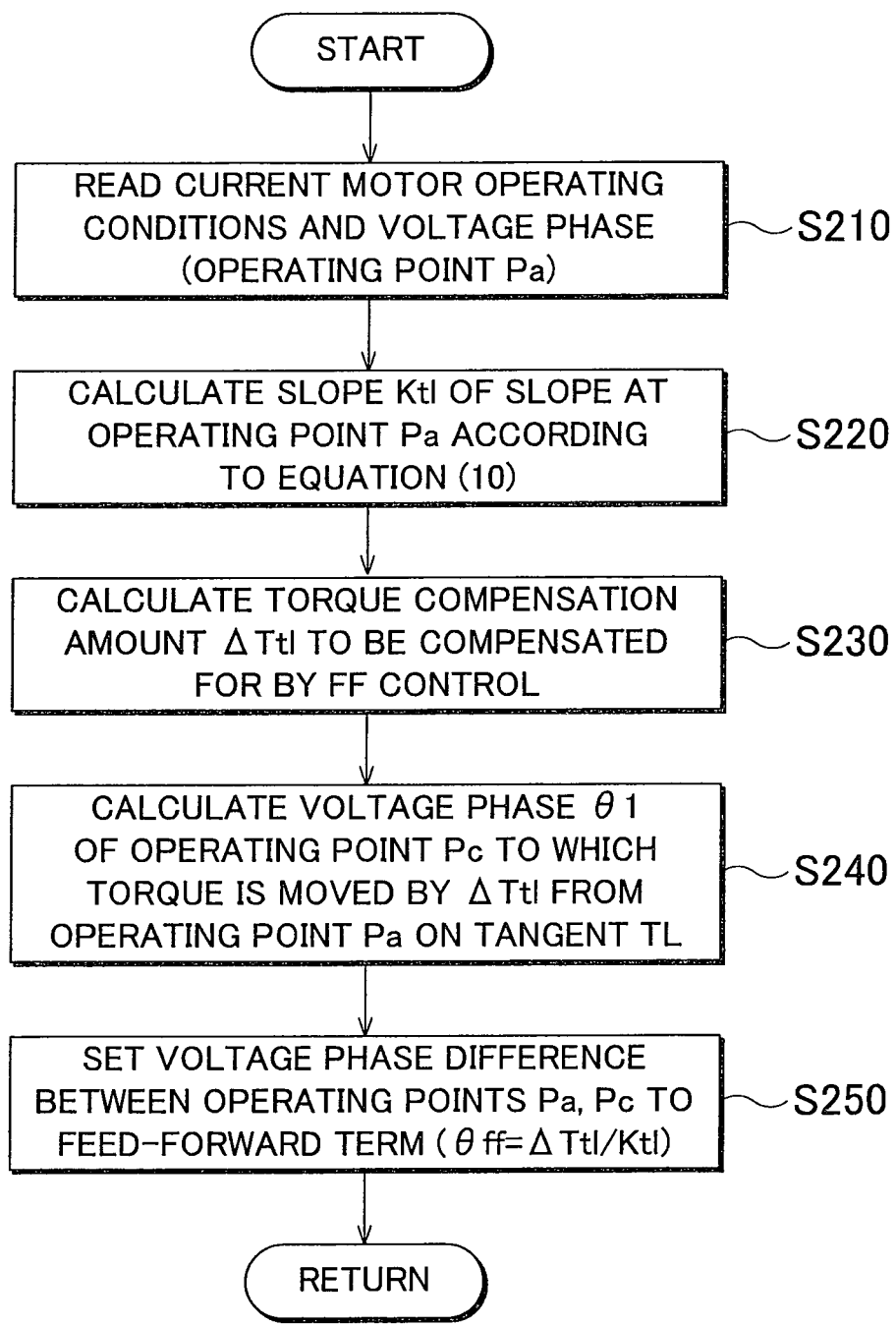
FIG. 8 is a flowchart explaining a process of calculating the feed-forward term in FIG. 7 in detail.

Referring to FIG. 7, the control device 30 acquires a torque command value Tqcom of the AC motor M1 in step S100. Then, the control device 30 calculates a feedback term θfb of voltage phase control in step S110, through a feedback control operation (computation) based on a torque deviation ΔTq as a deviation from the torque command value Tqcom. Namely, the operation of step S110 corresponds to the function of the feedback controller 430 of FIG. 5.

In step S120, the control device 30 further sets a feed-forward term θff of voltage phase control, based on the motor operating conditions of the AC motor M1 and the torque command value Tqcom. Namely, the operation of step S120 corresponds to the function of the feed-forward controller 440 of FIG. 5.

In step S130, the control device 30 calculates a voltage phase θv to be achieved in the current control cycle, by adding the feedback term θfb and the feed-forward term θff. Namely, the operation of step S130 corresponds to the function of the addition unit 450 of FIG. 5.

Then, in step S140, the control device 30 produces an inverter control command according to the voltage phase θv calculated in step S130, more specifically, produces switching commands of the inverter 14, namely, switching control signals S3-S8 of the switching devices Q3-Q8. The operation of step S140 corresponds to the functions of the rectangular wave generator 460 and signal generation unit 470 of FIG. 5.

Next, a process of calculating the feed-forward term in step S120 of FIG. 7 will be described in detail with reference to FIG. 8.

Referring to FIG. 8, the control device 30 reads the current motor operating conditions (VH, Nm) and the torque command value Tqcom in step S210, so as to acquire the operating point Pa of FIG. 6.

Then, the control device 30 calculates the slope Ktl of a tangent TL at the operating point Pa in step 230, according to the above-indicated equation (10). Namely, the operation of step S220 corresponds to the function of the linear approximation unit 442 (FIG. 5).

In step S230, the control device 30 calculates a torque compensation amount ΔTtl to be compensated for through feed-forward control, based on the torque command value Tqcom. As described above, the torque compensation amount ΔTtl may be calculated according to a change in the torque command value Tqcom between the current cycle and the last control, or a difference between the result of calculation according to the equation (9) and the torque command value Tqcom of the current control cycle.

Then, the control device 30 calculates a voltage phase θ1 at an operating point Pc to which the operating point is moved along the tangent TL from the operating point Pa by a distance corresponding to the change in torque ΔTtl in step S240, and sets a different (θ1−θ0) in voltage phase between the operating points Pa, Pc to the feed-forward term θff in step S250. Namely, the feed-forward term θff is calculated according to the above-indicated equation (11).

According to the rectangular wave voltage control of the first embodiment, the feed-forward control based on the torque command value can be implemented by simple computations, based on linear approximation of a characteristic of change in torque relative to change in voltage phase, at the operating point defined by the current motor operating conditions and voltage phase, which point lies on a non-linear characteristic curve representing the relationship between the voltage phase and the torque.

It is thus possible to enhance the control response at the time of change of the torque command value by the feed-forward control, without complicating the computations for obtaining the amount of change in the voltage phase (feed-forward term θff) and/or increasing the computation load.

First Modified Example of the First Embodiment In the operation (FIG. 6) according to the first embodiment, the feed-forward term θff is calculated by obtaining the operating point Pc on the tangent TL, instead of the operating point Pb on the torque characteristic curve 500 which is to be primarily obtained, based on the slope of the tangent at the current operating point Pa on the torque characteristic curve 500. Accordingly, a large error may occur in the feed-forward term θff set in the above manner, since a difference between the operating points Pb and Pc may become large due to a difference between the slopes of the tangents at the operating points Pa, Pb, depending on the region of the voltage phase concerned.

In the first modified example of the first embodiment, therefore, a method of calculating the feed-forward term θff with improved accuracy, namely, an operation to make the feed-forward term θff closer to a difference (θ0-θ0#) in voltage phase between the current operating point Pa and the desired operating point Pb in FIG. 6, will be described.

Figure 9:
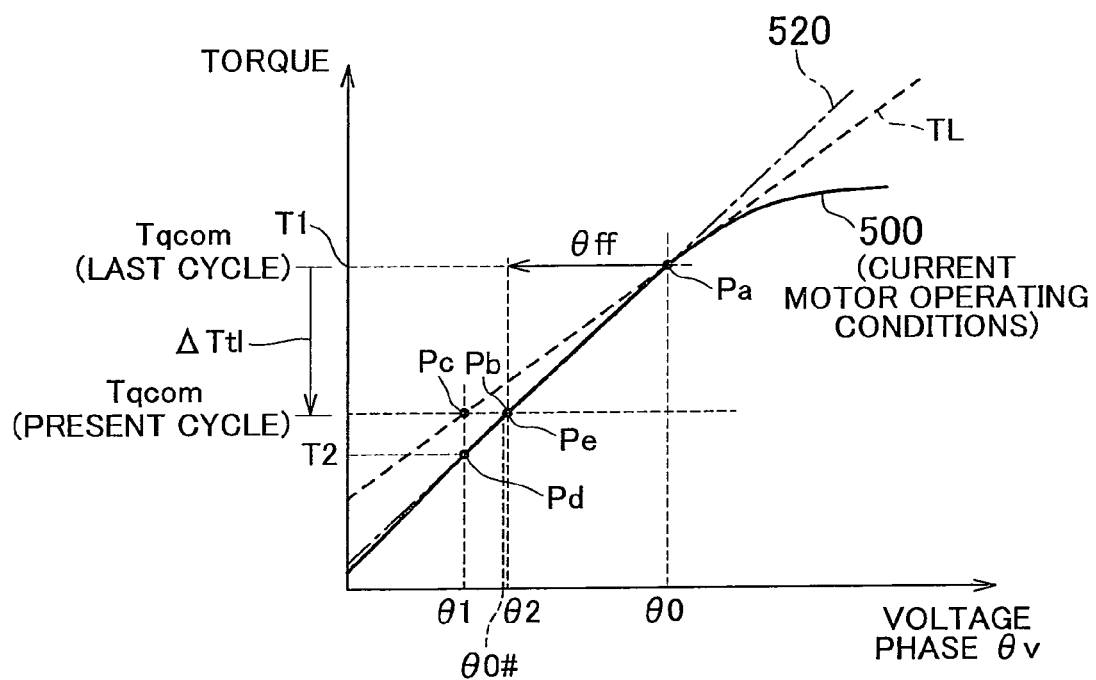
FIG. 9 is a graph useful for explaining calculation of a feed-forward term by a feed-forward controller in rectangular wave voltage control according to a first modified example of the first embodiment.

Referring to FIG. 9, the slope Ktl of the tangent TL at the current operating point Pa that lies on the torque characteristic curve 500 and corresponds to the current motor operating conditions is obtained, and the operating point Pc (voltage phase θ1) to which the operating point is moved along the tangent TL from the operating point Pa by a distance corresponding to a change ΔTtl/Ktl in voltage phase is obtained, as explained above with respect to the first embodiment.

In the rectangular wave voltage feed-forward control according to the first modified example of the first embodiment, an operating point Pd (torque value T2) that lies on the torque characteristic curve 500 and has the same voltage phase θ1 as the operating point Pc is further obtained. Then, an operating point Pe that lies on a straight line 520 passing the operating points Pa and Pd and is reached when torque is changed by the torque compensation amount ΔTtl from that of the operating point Pa is obtained. It is geometrically understood from FIG. 9 that the voltage phase θ2 of the operating point Pe is closer to the voltage phase θ0# of the desired operating point Pb than the voltage phase θ1 of the operating point Pc.

The rectangular wave voltage control according to the first modified example of the first embodiment is different from the rectangular wave voltage control according to the first embodiment in that the calculation of the feed-forward term (step S120 of FIG. 7) is carried out according to the flowchart as shown in FIG. 10. The first modified example is identical with the first embodiment in the other respects, of which no detailed description will be repeated. According to the process of calculation as shown in FIG. 10, a difference in the voltage phase between the operating point Pa and the operating point Pe is obtained.

Referring to FIG. 10, the control device 30 sets the operating point Pc (voltage phase θ1) in step S300 by performing operations similar to those of steps S210-S240 of FIG. 8. Then, in step S310, the control device 30 calculates a torque value at an operating point that lies on the torque characteristic curve 500 and has the voltage phase θ1, according to the above-indicated equation (9). In this manner, the torque value T2 of the operating point Pd is obtained.

Then, the control device 30 calculates the slope k=(T1−T2)/(θ0−θ1) of the straight line 520 passing the operating points Pa and Pd in step S320. Here, the torque value T1 of the operating point Pa may also be calculated by the torque calculation unit 444 (FIG. 5) according to the equation (9). Alternatively, the torque command value Tqcom obtained in the last control cycle may be used as the torque value T1.

Then, in step S330, the control device 30 calculates the voltage phase θ2 of the operating point Pe which lies on the straight line 520 and has a voltage phase that differs from that of the operating point Pa by ΔTtl/k, based on the slope k obtained in step S320 and the torque compensation value ΔTtl (step S230). Then, the control device 30 sets the voltage phase difference ΔTtl/k between the operating points Pa and Pe to the feed-forward term θff in step S251.

Namely, the operating point Pd may be regarded as "second operating point", and the slope k may be regarded as "second slope", while θff obtained based on ΔTtl/k may be regarded as "second phase change amount".

According to the feed-forward control of the rectangular wave voltage according to the first modified example of the first embodiment, the amount of change in the voltage phase for compensating for the torque compensation amount ΔTtl, i.e., the feed-forward term θff, can be set with improved accuracy, according to the torque equation and its differential equation. Consequently, the control response of the feed-forward control at the time of change of the torque command value can be further enhanced.

Second Modified Example of the First Embodiment In a second modified example of the first embodiment, a method for determining the feed-forward term θff with even higher accuracy will be described.

Figure 11:
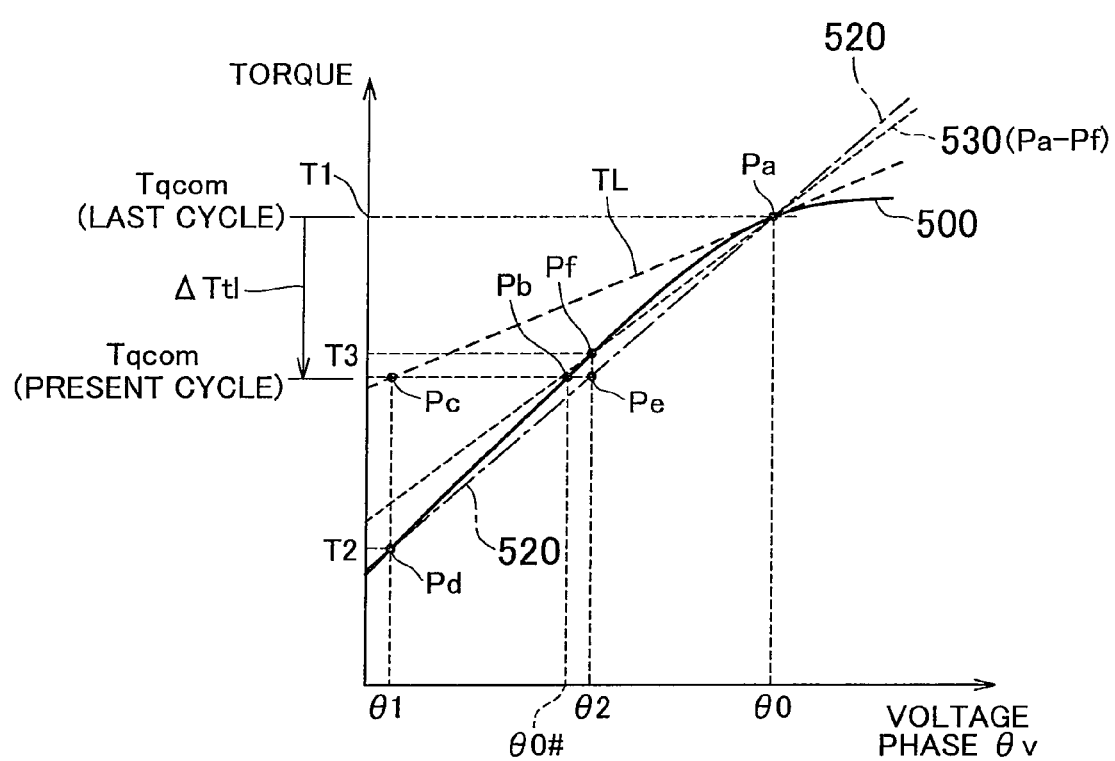
FIG. 11 is a graph useful for explaining calculation of a feed-forward term by a feed-forward controller in rectangular wave voltage control according to a second modified example of the first embodiment.

FIG. 11 is a graph useful for explaining calculation of an integral term shift amount in rectangular wave voltage control according to the second modified example of the first embodiment.

Referring to FIG. 11, in the second modified example of the first embodiment, the operating point Pe is obtained in the same manner as in the first modified example of the first embodiment, and then an operating point Pf (torque value T3) that lies on the torque characteristic curve 500 and has the same voltage phase θ2 as the operating point Pe is further obtained.

Then, if a torque difference |T3−Tqcom| is equal to or larger than a predetermined value, the slope k' of a straight line 530 that passes the operating points Pa and Pf is obtained, and the operating point Pe is updated to an operating point that lies on the straight line 530 and has a voltage phase that is moved by ΔTtl/k' from the voltage phase θ0 of the operating point Pa. Thus, the voltage phase of the updated operating point Pe is closer to the voltage phase θ0# of the desired operating point Pb than the voltage phase of the operating point Pe before it is updated.

Since the operating point Pf is updated as the operating point Pe is updated, the torque difference |T3−Tqcom| is evaluated again. Thus, the torque difference |T3−Tqcom| is compared with the predetermined value each time the operating point Pe is updated, and the updating of the operating points Pe and Pf is repeated as long as the torque difference |T3−Tqcom| is equal to or larger than the predetermined value. This control arrangement makes it possible to control the torque deviation to be within a given range after the feed-forward control is executed.

Namely, the operating point Pf may be regarded as "third operating point", and the slope k' may be regarded as "third slope", while θff obtained based on ΔTtl/k' may be regarded as "third phase change amount".

Figure 12:
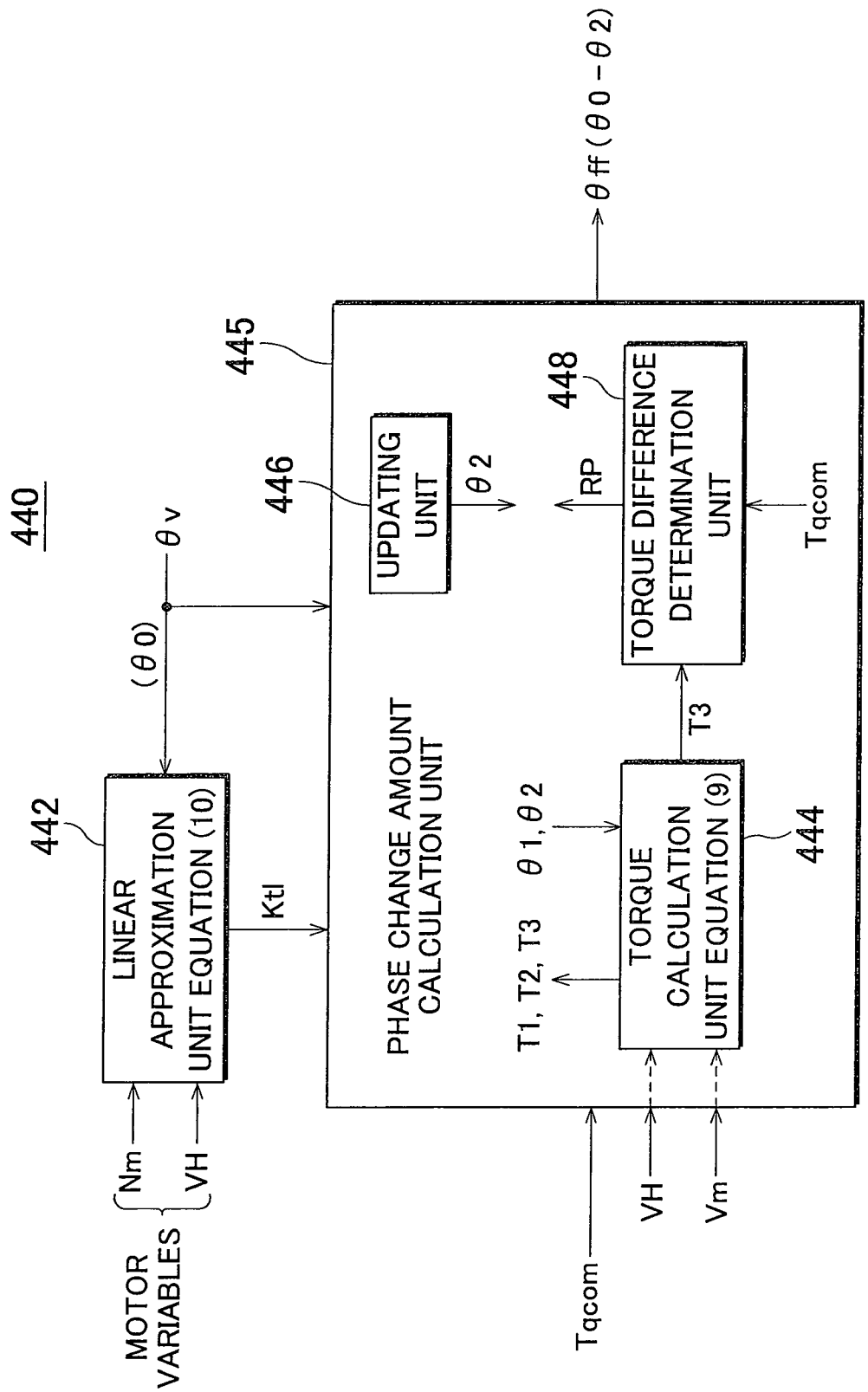
FIG. 12 is a functional block diagram illustrating the configuration of the feed-forward controller for use in the rectangular wave voltage control according to the second modified example of the first embodiment.
Figure 13:
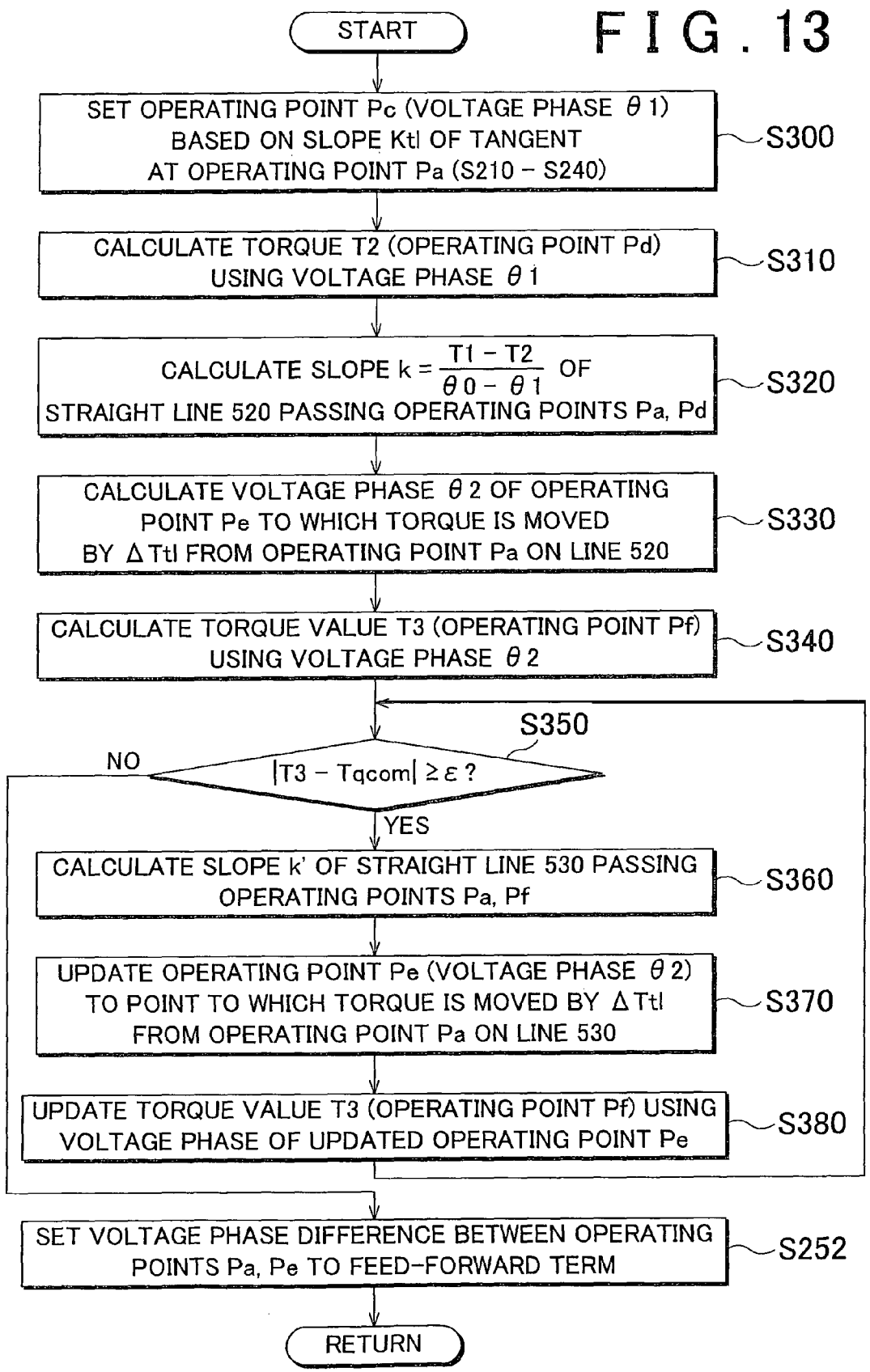
FIG. 13 is a flowchart explaining in detail a process of calculating the feed-forward term in the rectangular wave voltage control according to the second modified example of the first embodiment.

The rectangular wave voltage control according to the second modified example of the first embodiment is different from that of the first embodiment in that the construction of the feed-forward controller 440 is modified into the one as shown in FIG. 12, and that the feed-forward term θff is calculated (in step S120 of FIG. 7) according to the flowchart as shown in FIG. 13. The second modified example is identical with the first embodiment in the other aspects, of which no detailed description will be repeated.

Referring to FIG. 12, in the rectangular wave voltage control according to the second modified example of the first embodiment, the phase change amount calculation unit 445 further includes an updating unit 446 and a torque difference determination unit 448, in addition to the arrangement as shown in FIG. 5. The updating unit 446 performs updating operations on the above-mentioned operating points Pe, Pf, according to an update command RP from the torque difference determination unit 448. The torque difference determination unit 448 determines whether the torque difference |T3−Tqcom| between the torque value T3 of the operating point Pf and the torque command value Tqcom is equal to or smaller than the predetermined value, and produces an update command RP in accordance with the result of the determination.

FIG. 13 illustrates a process or routine for calculating the feed-forward term, which is executed by the feed-forward controller 440 (the control device 30) in the rectangular wave voltage control according to the second modified example of the first embodiment.

Referring to FIG. 13, the control device 30 executes steps S300-S330 similar to those of FIG. 10, so as to set the operating point Pe (voltage phase θ2). Furthermore, the control device 30 obtains the torque value T3 of the operating point Pf that lies on the torque characteristic curve 500 and has the voltage phase θ2, in step S340. Then, the control device 30 compares a torque difference (absolute value) between the torque command value Tqcom and the torque value T3 of the operating point Pf, with a predetermined threshold value ε.

If the torque difference |T3−Tqcom| is smaller than ε (i.e., if a negative decision (NO) is obtained in step S350), the torque deviation that appears when the operating point Pf is employed is presumed to be smaller than the threshold value ε. Accordingly, the control device 30 proceeds to step S252 to set a difference between the voltage phases of the operating points Pa, Pe as the feed-forward term θff. Namely, the feed-forward term θff is set according to an equation that θff=θ0−θ2.

When the torque deviation |T3−Tqcom| is equal to or larger than ε in step S350 (i.e., when an affirmative decision (YES) is obtained in step S350), the control device 30 executes steps S360-S380 to update the operating points Pe, Pf in order to make the operating point Pf even closer to the desired operating point Pb.

More specifically, the control device 30 determines the slope k' of the straight line 530 that passes the operating point Pa and the operating point Pf of the current cycle, in step S360, and updates the operating point Pe (voltage phase θ2) to a point that lies on the straight line 530 and has a voltage phase that is moved by ΔTtl/k' from that of the operating point Pa, in step S370.

In step S380, the control device 30 updates the torque value T3 by calculating torque at a point on the torque characteristic curve 500, which point has the same voltage phase as that of the operating point Pe updated in step S370. With the torque value T3 thus updated, the operating point Pf is also updated. Based on the updated torque value T3, the determination of step S350 is made again.

Then, the updating process of steps S360 to S380 for updating the operating points Pe, Pf is repeatedly executed until the deviation |T3−Tqcom| becomes smaller than ε and a negative decision (NO) is obtained in step S350.

Consequently, the feed-forward term θff can be set so that the torque deviation at the time of execution of the feed-forward control becomes equal to or smaller than ε. In view of the computation load and required computation time of the control device 30, the number of execution of the updating process (steps S360-S380) for updating the operating points Pe, Pf when a negative decision (NO) is obtained in step S350 may be limited in advance to a given number (e.g., one time or two or more times).

According to the rectangular wave voltage control of the second modified example of the first embodiment, the amount of change in the voltage phase for compensating for the torque compensation amount ΔTtl, or the feed-forward term θff, can be set with even higher accuracy, according to the torque equation and its differential equation, so that the torque deviation becomes smaller than the predetermined value (threshold value ε).

Second Embodiment In the second embodiment, feed-forward control effected by repeating the process of calculating the feed-forward term according to the first embodiment will be described.

FIG. 14 is a graph useful for explaining calculation of the feed-forward term by the feed-forward controller in the rectangular wave voltage control according to the second embodiment.

Referring to FIG. 14, the feed-forward term for use in the feed-forward control of the second embodiment is calculated based on the slope of a tangent on the torque characteristic curve 500 represented by the above-indicated equation (9). Since the torque characteristic curve 500 involves trigonometric functions as is understood from the equation (9), there are two or more voltage phases corresponding to the same torque. Therefore, if the current operating point Pa exists in a phase region where the slope of the tangent is small, as shown FIG. 14 by way of example, the operating point Pd may be set to an operating point that lies on the torque characteristic curve 500 and has a voltage phase θ1 (FIG. 14) that is remote from the desired voltage phase (θ0#). Even with the voltage phase θ1 thus determined, torque calculated according to the equation (9) using the voltage phase θ1 is equal to the torque command value Tqcom, and it is thus determined that the AC motor is able to produce torque that matches the torque command value Tqcom. Thus, there is a need to solve the problem of how to exclude or eliminate such an error in calculation of the voltage phase, or the feed-forward term.

In the feed-forward control of the second embodiment, the voltage phase calculation based on the slope of the tangent similar to that of the first embodiment (and its first and second modified examples) is repeatedly performed in combination with a determination as to the appropriateness or correctness of the voltage phase, so that the process of calculating the feed-forward term is easily and correctly implemented.

As is understood from FIG. 14, the voltage phase should be a positive value (θ1>0) when a positive torque command is generated (Tqcom>0), and the voltage phase should be a negative value (θ1<0) when a negative torque command is generated (Tqcom<0). Accordingly, erroneous setting of the voltage phase as shown in FIG. 14 can be avoided by checking if the sign (positive or negative) of the torque command value Tqcom matches that of the voltage phase θ1.

If the sign (positive or negative) of the torque command value Tqcom does not match that of the voltage phase θ1, namely, the torque command value Tqcom and the voltage phase θ1 are of opposite sign, the voltage phase θ1 is updated to a given phase (e.g., voltage phase=0 where the output torque=0). As a result, the operating point Pd is also updated to an operating point that lies on the torque characteristic curve 500 and corresponds to the updated voltage phase.

Then, a torque difference between the torque value of the updated operating point Pd and the torque command value is determined. If the torque difference is equal to or larger than a predetermined value, the slope k of a straight line 520 that connects the operating point Pa and the current operating point Pd is obtained, and the operating point Pd is further updated by obtaining the voltage phase of an operating point that lies on the straight line 520 and has torque that differs from that of the operating point Pa by ΔTtl, and calculating the torque value at the obtained voltage phase (θ2) according to the above equation (9). The updating of the operating point Pd is repeatedly executed until the torque difference becomes smaller than the predetermined value, and the feed-forward term is set according to the voltage phase of the operating point Pd at the time when the torque difference becomes smaller than the predetermined value.

In the above manner, it is possible to repeatedly calculate the voltage phase based on the slope of the tangent on the torque characteristic curve 500 according to the first embodiment, so that the torque deviation becomes smaller than the predetermined value, while preventing the voltage phase from being set in a region where the sign (positive or negative) of the torque command value Tqcom does not match that of the voltage phase.

Figure 15:
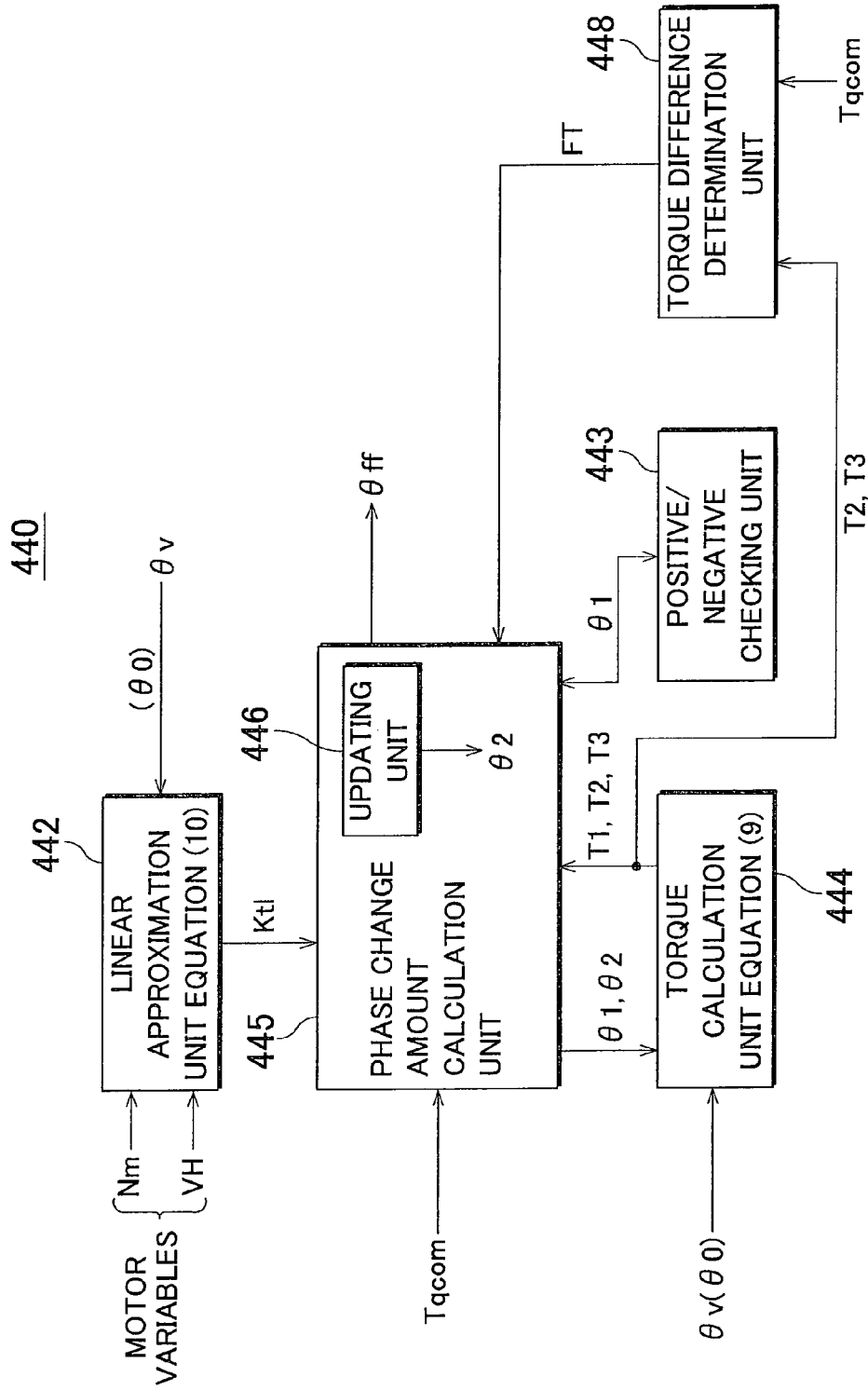
FIG. 15 is a functional block diagram illustrating the configuration of the feed-forward controller for use in rectangular wave voltage control according to the second embodiment.
Figure 16:
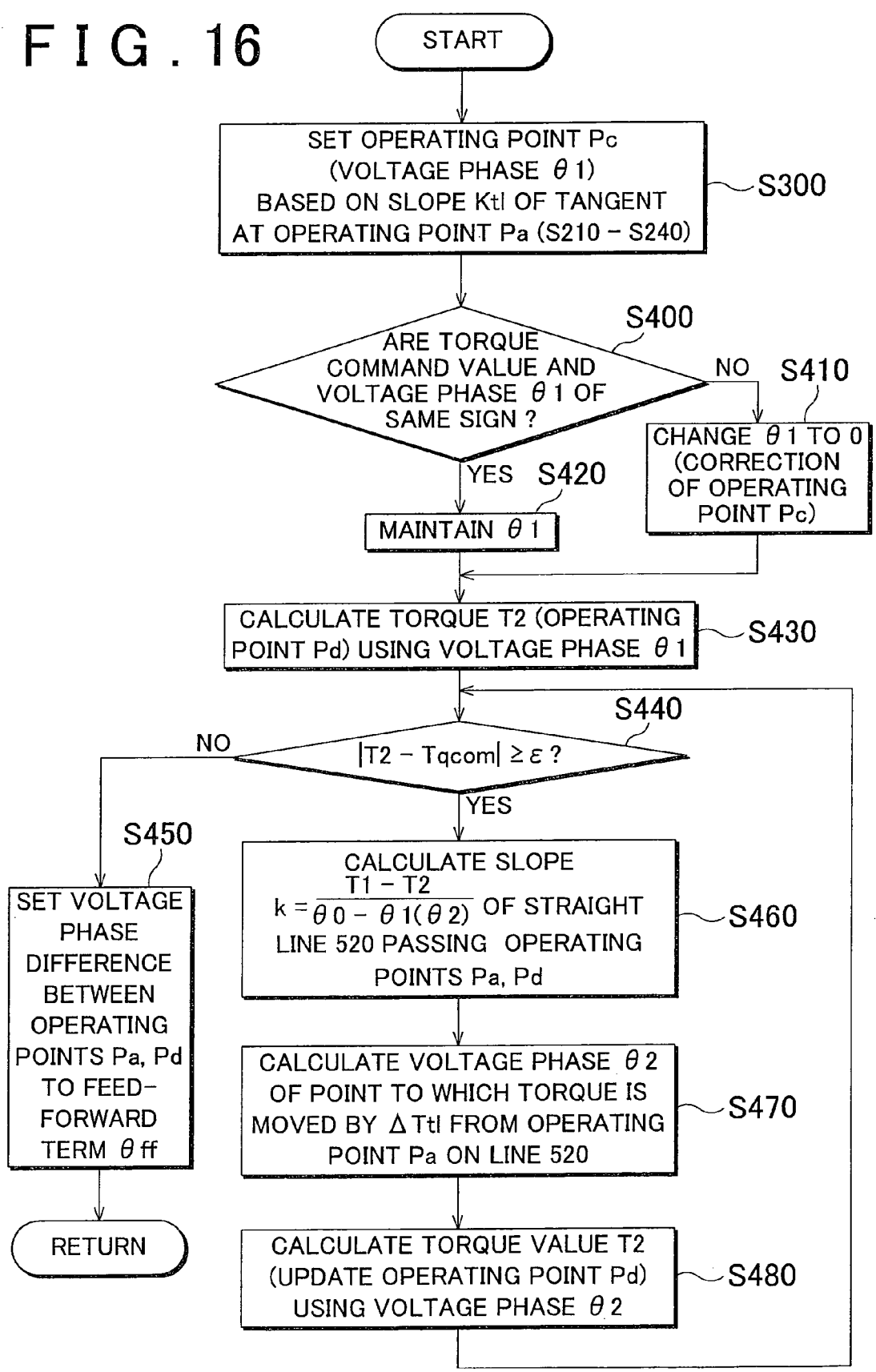
FIG. 16 is a flowchart explaining in detail a process of calculating the feed-forward term in the rectangular wave voltage control according to the second embodiment.

The rectangular wave voltage control of the second embodiment is different from that of the first embodiment in that the configuration of the feed-forward controller 440 is modified into the one as shown in FIG. 15, and the feed-forward term θff is calculated (in step S120 of FIG. 7) according to the flowchart as shown in FIG. 16. The second embodiment is substantially the same as the first embodiment in the other aspects, of which no detailed description will be repeated.

Referring to FIG. 15, in the rectangular wave voltage control of the second embodiment, the feed-forward controller 440 includes the linear approximation unit 440, phase change amount calculation unit 445, torque calculation unit 444, positive/negative checking unit 443 and torque difference determination unit 448. The phase change amount calculation unit 445 has an updating unit 446.

The phase change amount calculation unit 445 calculates a voltage phase θ1 (θ1=θ0+ΔTtl/Ktl), based on the slope Ktl of the tangent calculated by the linear approximation unit 442 and the torque compensation amount (ΔTtl). The positive/negative checking unit 443 checks if the sign (positive or negative) of the calculated voltage phase θ1 matches that of the torque command value Tqcom. The positive/negative checking unit 443 changes the voltage phase θ1 into a predetermined value (e.g., 0) if these values are of opposite sign, and maintains the voltage phase θ1 if these values are of the same sign.

The torque calculation unit 444 obtains a torque value T2 through torque calculation according to the above-indicated equation (9), using the voltage phase θ1 thus corrected or maintained by the positive/negative checking unit 443 and the current motor operating conditions. Namely, the calculation of the torque value T2 is equivalent to determination of the operating point Pd (second operating point). The torque calculation performed by the torque calculation unit 444 corresponds to the function of the "first torque calculation unit".

The torque difference determination unit 448 determines whether a difference |T2−Tqcom| between the torque value T2 calculated by the torque calculation unit 444 and the torque command value Tqcom is larger than a predetermined value ε. If |T2−Tqcom| is equal to or larger than ε, a flag FT that requests updating of the operating point Pd is set to ON. If |T2−Tqcom| is smaller than ε, the flag FT is set to OFF.

The updating unit 446 performs an updating operation on the operating point Pd in response to setting of the flag FT to ON. More specifically, the updating unit 446 obtains the voltage phase θ2 of an operating point that lies on a straight line connecting the operating point Pa with the current operating point Pd and has torque that differs from that of the operating point Pa by ΔTtl. Then, the operating point Pd is updated to an operating point that lies on the torque characteristic curve 500 and has the voltage phase θ2. This process is similar to the process of determining the operating points Pe and Pf in FIG. 11 (the second modified example of the first embodiment). The operating point Pf in FIG. 11 corresponds to the operating point Pd (second operating point) obtained as a result of updating by the updating unit 446.

Each time the updating unit 446 updates the operating point Pd in response to the flag FT (ON), the torque calculation unit 444 obtains the torque value T2 of the updated operating point Pd through torque calculation according to the equation (9), using the voltage phase θ2 obtained by the updating unit 446 and the current motor operating conditions. The torque calculation by the torque calculation unit 444 corresponds to the function of the "second torque calculation unit".

Also, the torque difference determination unit 448 compares the deviation |T2−Tqcom| of the updated torque value T2 from the torque command value Tqcom, with the predetermined value ε.

If |T2−Tqcom| is equal to or larger than ε, the updating unit 446 updates the straight line that connects the current operating point Pd (after updated) and the operating point Pa, and updates the voltage phase θ2 to a voltage phase of an operating point that lies on the updated straight line and has torque that differs from that of the operating point Pa by ΔTtl. In accordance with the updated voltage phase θ2, the torque value T2 is updated by the torque calculation unit 444, and the torque difference between the torque value T2 and the torque command value Tqcom is evaluated by the torque difference determination unit 448. Thus, a series of the updating operations as described above is repeatedly executed until the relationship that |T2−Tqcom|<ε is satisfied with respect to the torque value T2 at the updated operating point Pd.

If |T2−Tqcom| becomes smaller than ε, the phase change amount calculation unit 445 sets a feed-forward term θff, according to a difference in voltage phase (θ0−θ1 or θ0−θ2) between the operating point Pa and the operating point Pd obtained at the time when |T2−Tqcom| becomes smaller than ε.

FIG. 16 illustrates a process or routine for calculating the feed-forward term, which is executed by the feed-forward controller 440 (the control device 30) in the rectangular wave voltage control according to the second embodiment.

Referring to FIG. 16, the control device 30 sets the operating point Pc (voltage phase θ1) in step S300 by performing operations similar to those of steps S210-S240 of FIG. 8.

The control device 30 checks if the sign (positive or negative) of the voltage phase θ1 obtained in step S300 matches that of the torque command value Tqcom in step S400. If these values (θ1 and Tqcom) are of the same sign (i.e., if an affirmative decision (YES) is obtained in step S400), the control device 30 proceeds to step S420 to maintain the voltage phase θ1 obtained in step S300. If these values are of opposite sign (i.e., if a negative decision (NO) is obtained in step S400), the control device 30 proceeds to step S410 to change the voltage phase θ1 to a predetermined value (typically, θv=0 where torque=0). Namely, the operations of steps S400 to S420 correspond to the function of the positive/negative checking unit 443 of FIG. 15.

In step S430, the control device 30 calculates the torque value T2 according to the equation (9) that reflects the current motor operating conditions, using the voltage phase θ1 corrected in step S410 or maintained in step S420. As described above, the calculation of the torque value T2 is equivalent to the determination of the operating point Pd. The operation of step S430 is implemented by the torque calculation unit 444 of FIG. 15.

In step S440, the control device 30 determines whether the difference |T2−Tqcom| between the torque value T2 calculated in step S430 and the torque command value Tqcom is equal to or larger than the predetermined value ε. If |T2−Tqcom| is equal to or larger than ε (i.e., if an affirmative decision (YES) is obtained in step S440), the control device 30 generates a command for executing a process of steps S460-S480 for updating the operating point Pd. Namely, the operation of step S440 corresponds to the function of the torque difference determination unit 448 of FIG. 15.

In step S460, the control device 30 calculates the slope k=(T1−T2)/(θ0−θ1) of the straight line 520 that passes the operating point Pa and the operating point Pd at the time of execution of this step. In this connection, the torque value T1 of the operating point Pa may also be calculated by the torque calculation unit 444 (FIG. 15) according to the equation (9). Alternatively, the torque command value Tqcom obtained in the last control cycle may be used as the torque value T1.

In step S470, the control device 30 calculates the voltage phase θ2 to which the voltage phase is moved by ΔTtl/k from that of the operating point Pa on the straight line 520, based on the slope k obtained in step S460 and the torque compensation amount ΔTtl. Then, the operating point Pd is updated to an operating point that lies on the torque characteristic curve 500 and has the voltage phase θ2 (S470). Namely, the operations of steps S460 and S470 correspond to the function of the updating unit 446 of FIG. 15.

In step S480, the control device 30 obtains the torque value T2 of the updated operating point Pd through torque calculation according to the equation (9), using the updated voltage phase θ2 and the current motor operating conditions. The operation of step S480 is also implemented by the torque calculation unit 444 of FIG. 15.

After updating the operating point Pd in steps S460 to S480, the control device 30 makes a determination on the torque difference in step S440, using the updated torque value T2. Then, if |T2−Tqcom| is equal to or larger than ε (i.e., if an affirmative decision (YES) is obtained in step S440), the process of steps S460 to S480 is executed again, so as to further update the operating point Pd at this point in time (after it is updated). Namely, the updating process of steps S460 to S480 is repeatedly executed until the relationship that |T2−Tqcom|<ε (NO in step S440) is satisfied with respect to the torque value T2 at the operating point Pd after updated. In view of the computing load and required computing time of the control device 30, the number of times that the updating process of steps S460 to S480 is executed may be limited in advance to a predetermined number of times.

If the relationship that |T2−Tqcom|<ε (NO in step S440) is satisfied with respect to the torque value T2 calculated in step S430 or step S480, the control proceeds to step S450. In step S450, the control device 30 sets the feed-forward term θff according to the difference in voltage phase (θ0−θ1 or θ0−θ2) between the operating point Pa and the operating point Pd at the time of execution of step S450.

Thus, according to the feed-forward control of the rectangular wave voltage of the second embodiment, when the amount of change in the voltage phase for compensating for the torque compensation amount $\Delta T1$ is calculated according to the torque equation and its differential equation, it is possible to set the feed-forward term through repeated calculations for reducing the torque deviation to be smaller than the predetermined value, while avoiding setting of an inappropriate voltage phase based on matching of the sign (positive or negative) between the torque command value and the voltage phase.

In particular, the normality/abnormality of setting of the feed-forward term based on the linear approximation (the slope of the tangent at the operating point Pa) similar to that of the first embodiment is determined based on matching in the sign (positive or negative) between the torque command value and the voltage phase, which makes it unnecessary to employ an arbitrary abnormality determining operation involving adjustment of a determination value, for example. Namely, the feed-forward term can be appropriately calculated by using the calculation process common to both of the case where the feed-forward term is set normally and the case where the feed-forward term is set abnormally, thus making it possible to implement the feed-forward control operation that can be smoothly applied to the actual machines.

Third Embodiment In the second embodiment, the sign (positive or negative) of the torque command value Tqcom is supposed to match the sign (positive or negative) of the voltage phase $\theta v$, according to the above-indicated equation (9).

Figure 17:
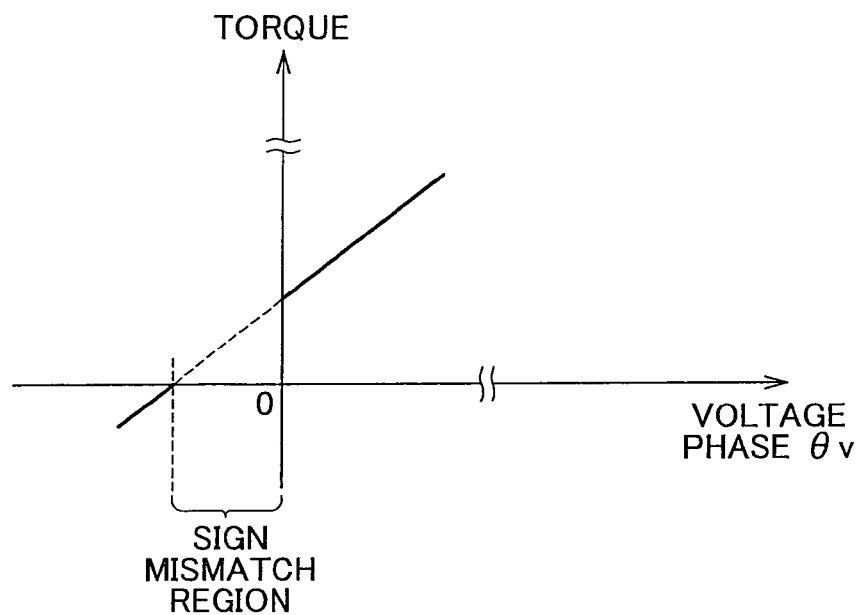
FIG. 17 is a graph useful for explaining a mismatch in sign (positive or negative) between torque and voltage phase.

However, in a region where the torque value is close to zero, the sign (positive or negative) of the torque command value Tqcom may not necessarily coincide with that of the voltage phase $\theta v$, due to an influence of the winding resistance ignored when the equation (9) is derived, as shown in FIG. 17. Namely, there actually exists a phase region in which the voltage phase is negative whereas the torque value is positive, which region may be called "sign mismatch region", in the vicinity of the origin of the graph shown in FIG. 17.

If the torque command value is set in the phase region as described above, the feed-forward term may not be appropriately set according to the feed-forward control of the second embodiment. In the third embodiment, a simpler calculation process for normally setting the feed-forward term even in this region will be described.

Figure 18:
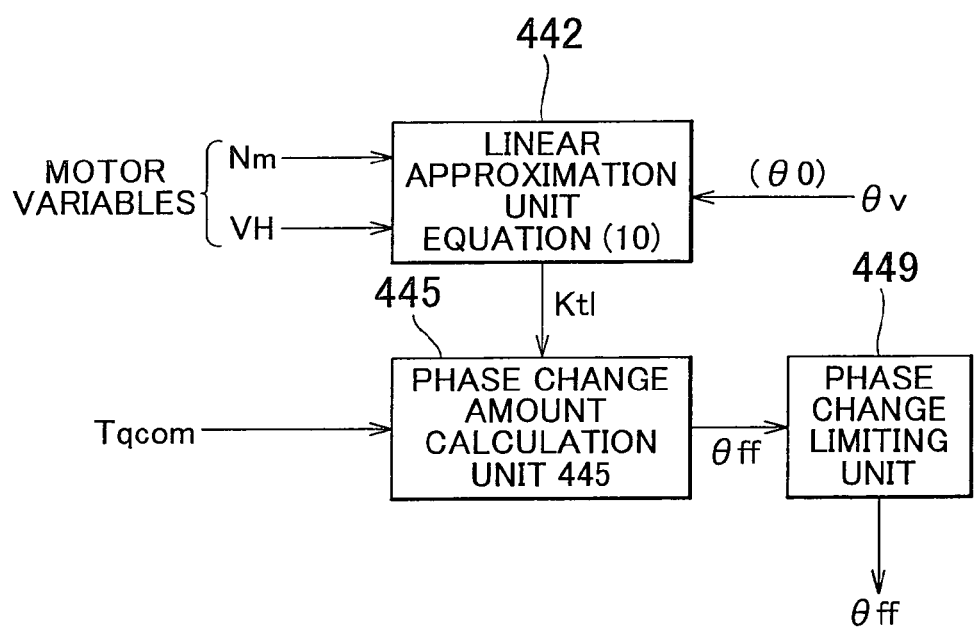
FIG. 18 is a functional block diagram illustrating the configuration of a feed-forward controller for use in rectangular wave voltage control according to a third embodiment of the invention.
Figure 19:
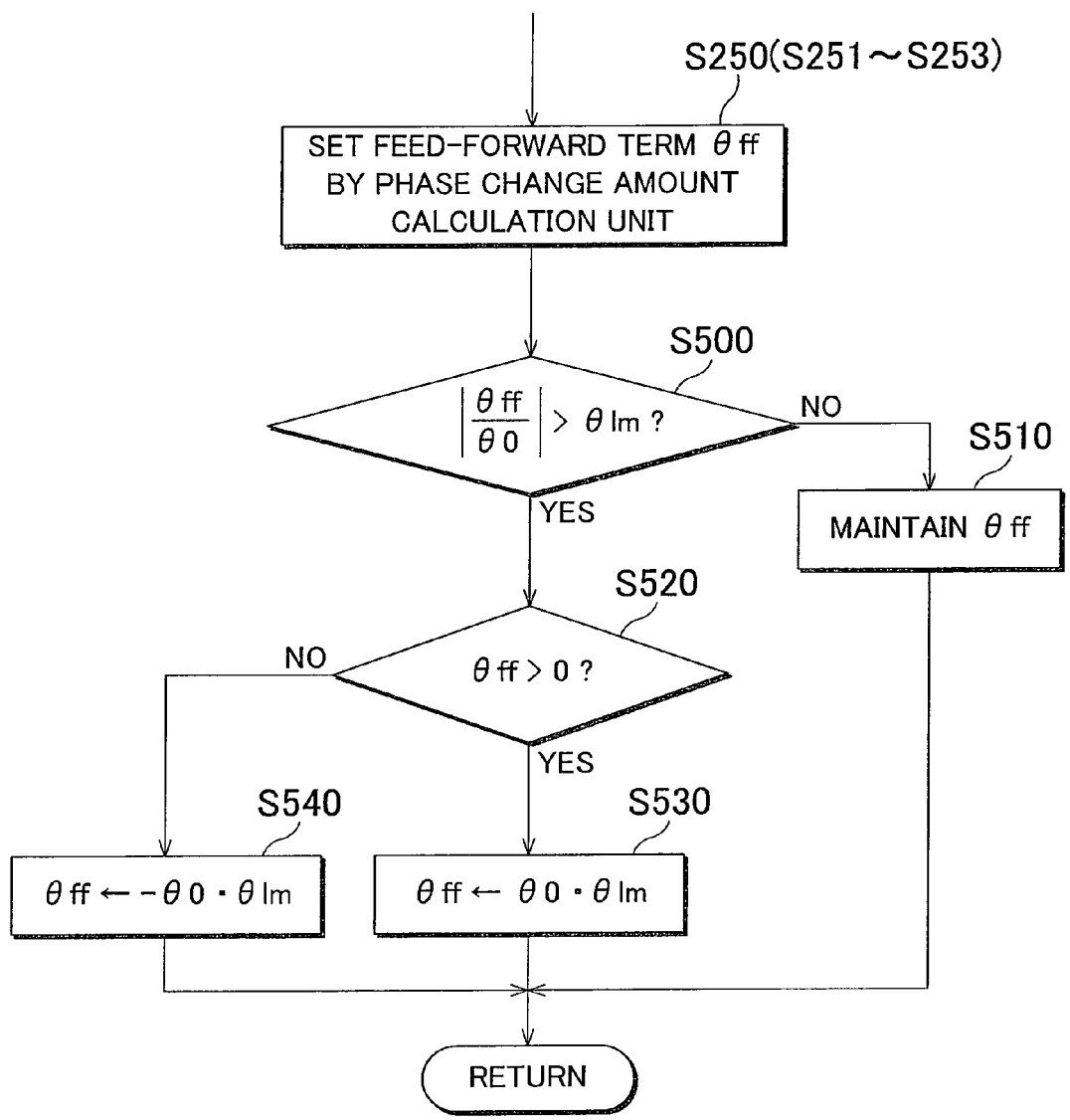
FIG. 19 is a flowchart explaining in detail a process of calculating a feed-forward term in the rectangular wave voltage control according to the third embodiment.

The rectangular wave voltage control of the third embodiment is different from that of the first embodiment in that the configuration of the feed-forward controller 440 is changed into the one as illustrated in FIG. 18, and the feed-forward term $\theta$ff is calculated (in step S120 of FIG. 7) according to the flowchart as shown in FIG. 19. The third embodiment is substantially the same as the first embodiment in the other aspects, of which no detailed description will be repeated.

Referring to FIG. 18, the feed-forward controller 440 of the third embodiment further includes a phase change limiting unit 449, in addition to the linear approximation unit 442 and phase change amount calculation unit 445 similar to those of FIG. 5. When the feed-forward term $\theta$ff set by the phase change amount calculation unit 445 exceeds a prescribed range, the phase change limiting unit 449 limits the amount of change in the voltage phase under the feed-forward control, i.e., the feed-forward term $\theta$ff, so that the feed-forward term $\theta$ff falls within the prescribed range. The prescribed range may be defined by the value (absolute value) of the feed-forward term $\theta$ff itself, or may be defined by the ratio ($\theta$ff/$\theta$0) of the feed-forward term $\theta$ff to the current voltage phase $\theta$0 or its absolute value.

FIG. 19 illustrates details of the process or routine for calculating the feed-forward term for use in the rectangular wave voltage control of the third embodiment.

Referring to FIG. 19, after setting the feed-forward term $\theta$ff in step S250 (FIG. 8) or step S251 (FIG. 10), the control unit 30 determines whether the feed-forward term $\theta$ff exceeds the prescribed range in step S500. Namely, the rectangular wave voltage control of the third embodiment is combined with the calculation of the feed-forward term according to the first embodiment or its first modified example (or when the number of times of updating is limited in the second modified example of the first embodiment), in which the calculation is not repeatedly performed until the torque deviation becomes smaller than the predetermined value $\epsilon$.

In step S500, as one example of phase change limitation, the absolute value $|\theta ff/\theta 0|$ of the ratio of the feed-forward term $\theta$ff to the current voltage phase $\theta$0 is compared with a limit value $\theta$lm. If $|\theta ff/\theta 0|$ is equal to or smaller than $\theta$lm (i.e., if a negative decision (NO) is obtained in step S500), the control device 30 maintains in S510 the feed-forward term $\theta$ff set in step S250 or step S251.

If $|\theta ff/\theta 0|$ is larger than $\theta$lm (i.e., if an affirmative decision (YES) is obtained in step S500), on the other hand, the control device 30 corrects the feed-forward term $\theta$ff so that it falls within the prescribed range in steps S520-S540. For example, when the limit value $\theta$lm is set as the ratio of the feed-forward term $\theta$ff to the current voltage phase $\theta$0 as described above, the control device 30 determines the sign (positive or negative) of the feed-forward term $\theta$ff in step S520, and changes the feed-forward term $\theta$ff to $\theta$0·$\theta$lm in step S530 if $\theta$ff is larger than 0 (i.e., if an affirmative decision (YES) is obtained in step S520). If $\theta$ff is smaller than 0 (i.e., if a negative decision (NO) is obtained in step S520), on the other hand, the control device 30 changes the feed-forward term $\theta$ff to—$\theta$0·$\theta$lm in step S540.

Thus, according to the feed-forward control of the rectangular wave voltage of the third embodiment, the amount of change in the voltage phase (feed-forward term) for compensating for the torque compensation amount $\Delta$Ttl can be determined by simple computations as in the first embodiment or its first modified example. Furthermore, by limiting the phase change amount represented by the feed-forward term $\theta$ff in each control cycle, it is possible to prevent an inappropriate feed-forward term $\theta$ff from being set due to the simplified computations, as explained above referring to FIG. 14 and FIG. 17. Consequently, the process of calculating the voltage phase change amount (feed-forward term $\theta$ff) can be simplified without suffering from erroneous setting of the feed-forward term, thus assuring enhanced stability of the feed-forward control.

As a preferable exemplary arrangement of the illustrated embodiments, the DC voltage generating portion 10# of the motor control system includes the converter 12 so that the input voltage (system voltage VH) applied to the inverter 14 can be variably controlled. However, the DC voltage generating portion 10# is not limited to this arrangement of the embodiments provided that the input voltage of the inverter 14 can be variably controlled. Also, it is not essential that the inverter input voltage is variable, but the invention is also applicable to an arrangement in which the output voltage of the DC power supply B is applied as it is to the inverter 14 (for example, an arrangement in which the converter 12 is not disposed between the DC power supply B and the inverter 14).

Furthermore, the motor variables reflected by the torque equation are not limited to those (Nm and VH) as described above.

In the illustrated embodiments, the AC motor that provides a load of the motor control system is assumed to be a permanent magnet motor installed in an electrically operated vehicle (such as a hybrid vehicle or an electric vehicle). However, the invention is also applicable to a system having a certain AC motor for use in the other types of equipment or apparatuses as a load.

The embodiments described in this specification should be considered as being illustrative but not limiting in all respects. The scope of the invention is defined by the claims, rather than the foregoing description of the embodiments, and is intended to embrace all changes or modifications that fall within the scope of the invention as defined by the claims and its equivalents.

The invention claimed is:

1. A control system for an AC motor, comprising:
an inverter that converts DC voltage into AC voltage for driving and rotating the AC motor; and
a rectangular wave voltage controller that controls a voltage phase of a rectangular wave voltage applied to the AC motor so as to perform torque control, wherein
the rectangular wave voltage controller includes:
a linear approximation unit that calculates a first slope as a ratio of a change in torque to a change in the voltage phase at a first operating point, based on the voltage phase and an operating state of the AC motor, said first operating point corresponding to the current operating state and voltage phase; and
a phase change amount calculation unit that calculates a torque compensation amount based on a command value of the torque control, and calculates an amount of change of the voltage phase according to a first phase change amount obtained by dividing the torque compensation amount by the first slope.

2. The control system according to claim 1, wherein:
the phase change amount calculation unit calculates a torque value at a second operating point corresponding to the current operating state and a first voltage phase to which the voltage phase is changed from the current value by the first phase change amount, according to a torque equation using at least one motor variable associated with the operating state and the voltage phase as variables;
the phase change amount calculation unit calculates a second slope as a ratio of a torque difference to a voltage phase difference between the first and second operating points; and
the phase change amount calculation unit calculates an amount of change of the voltage phase according to a second phase change amount obtained by dividing the torque compensation amount by the second slope.

3. The control system according to claim 2, wherein:
the phase change amount calculation unit sets a third operating point corresponding to the current operating state and a second voltage phase to which the voltage phase is changed from the current value by the second phase change amount, calculates a torque value at the third operating point according to the torque equation, and determines whether a difference between the calculated torque value and the command value is smaller than a predetermined value; and
the phase change amount calculation unit calculates a third slope as a ratio of a torque difference to a voltage phase difference between the third and first operating points when the difference is equal to or larger than the predetermined value, and calculates an amount of change of the voltage phase according to a third phase change amount obtained by dividing the torque compensation amount by the third slope.

4. The control system according to claim 3, wherein
the phase change amount calculation unit includes:
an updating unit that updates the third slope and the third phase change amount, based on a ratio of a torque difference to a voltage phase difference between the first operating point and the currently obtained third operating point, and updates the third operating point to an operating point corresponding to the current operating state and a voltage phase to which the voltage phase is changed from the current value by the updated third phase change amount; and
a torque difference determination unit that compares a difference between a torque value at the updated third operating point and the command value with the predetermined value each time the third operating point is updated by the updating unit, and causes the updating unit to repeatedly perform an updating operation on the third operating point as long as the difference is equal to or larger than the predetermined value.

5. The control system according to claim 2, wherein the phase change amount calculation unit calculates the torque value at the first operating point according to the torque equation, and calculates the torque compensation amount according to a difference between the torque value and the command value.

6. The control system according to claim 2, wherein the linear approximation unit calculates the first slope according to a differential equation obtained by differentiating the torque equation with respect to the voltage phase.

7. The control system according to claim 1, wherein the rectangular wave voltage controller further includes a phase change limiting unit that corrects the amount of change of the voltage phase calculated by the phase change amount calculation unit so that the amount of change falls within a prescribed range, when the calculated amount of change of the voltage phase is outside the prescribed range.

8. The control system according to claim 1, wherein the phase change amount calculation unit calculates the torque compensation amount according to an amount of change of the command value between the last control cycle and the present control cycle.

9. The control system according to claim 1, wherein the phase change amount calculation unit calculates a torque value at the first operating point according to a torque equation using at least one motor variable associated with the operating state of the AC motor and the voltage phase as variables, and calculates the torque compensation amount according to a difference between the torque value and the command value.

10. The control system according to claim 1, wherein the linear approximation unit calculates the first slope according to a differential equation obtained by differentiating a torque equation using at least one motor variable associated with the operating state of the AC motor and the voltage phase as variables, with respect to the voltage phase.

11. The control system according to claim 1, wherein the rectangular wave voltage controller further includes:
a feedback control unit that controls the voltage phase of the rectangular wave voltage through feedback on a torque deviation from the command value; and
a calculation unit that sets a command value of the voltage phase, according to a sum of the voltage phase set by the feedback control unit and the amount of change calculated by the phase change amount calculation unit.

12. The control system according to claim 1, wherein the AC motor is installed on an electrically operated vehicle, and generates vehicle driving force for driving the electrically operated vehicle.

13. A control system for an AC motor, comprising:
an inverter that converts DC voltage into AC voltage for driving and rotating the AC motor; and
a rectangular wave voltage controller that controls a voltage phase of a rectangular wave voltage applied to the AC motor so as to perform torque control, wherein
the rectangular wave voltage controller includes:
a linear approximation unit that calculates a first slope as a ratio of a change in torque to a change in the voltage phase at a first operating point, based on the voltage phase and an operating state of the AC motor, said first operating point corresponding to the current operating state and voltage phase;
a phase change amount calculation unit that calculates a torque compensation amount based on a command value of the torque control, and calculates a first phase change amount by dividing the torque compensation amount by the first slope;
a positive/negative checking unit that determines whether a first voltage phase to which the voltage phase is changed by the first phase change amount from the current value thereof and the command value are of the same sign, and corrects the first voltage phase to a predetermined value when the first voltage phase and the command value are of opposite sign, while maintaining the first voltage phase when the first voltage phase and the command value are of the same sign;
a first torque calculation unit that calculates a torque value at a second operating point corresponding to the corrected or maintained first voltage phase and the current operating state, according to a torque equation using at least one motor variable associated with the operating state of the AC motor and the voltage phase as variables;
a torque difference determination unit that determines whether a difference between the torque value at the second operating point and the command value is smaller than a predetermined value;
an updating unit that determines a second phase change amount by dividing the torque compensation amount by a second slope as a ratio of a torque difference to a voltage phase difference between the currently obtained second operating point and the first operating point when the torque difference determination unit determines that the difference is equal to or larger than the predetermined value, and updates the second operating point to an operating point corresponding to the current operating state and a second voltage phase to which the voltage phase is changed by the second phase change amount from the current value; and
a second torque calculation unit that calculates a torque value at the updated second operating point according to the torque equation each time the second operating point is updated by the updating unit, wherein
the torque difference determination unit determines whether a difference between the torque value and the command value is smaller than the predetermined value each time the torque value is calculated by the first or second torque calculation unit; and
the phase change amount calculation unit calculates an amount of change of the voltage phase according to a voltage phase difference between the currently obtained second operating point and the first operating point if the torque difference determination unit determines that the difference is smaller than the predetermined value.

14. The control system according to claim 13, wherein the positive/negative checking unit sets the first voltage phase to a voltage phase at which output torque of the AC motor is substantially equal to zero, when the first voltage phase and the command value are of opposite sign.

15. The control system according to claim 13, wherein the phase change amount calculation unit calculates the torque value at the first operating point according to the torque equation, and calculates the torque compensation amount according to a difference between the torque value and the command value.

16. The control system according to claim 13, wherein the linear approximation unit calculates the first slope according to a differential equation obtained by differentiating the torque equation with respect to the voltage phase.

17. The control system according to claim 13, wherein the rectangular wave voltage controller further includes:
a feedback control unit that controls the voltage phase of the rectangular wave voltage through feedback on a torque deviation from the command value; and
a calculation unit that sets a command value of the voltage phase, according to a sum of the voltage phase set by the feedback control unit and the amount of change calculated by the phase change amount calculation unit.

18. The control system according to claim 13, wherein the AC motor is installed on an electrically operated vehicle, and generates vehicle driving force for driving the electrically operated vehicle.

* * * * *